(12) United States Patent
Byblow et al.

(10) Patent No.: US 9,123,256 B2
(45) Date of Patent: Sep. 1, 2015

(54) TRAINING DEVICE

(71) Applicant: Auckland Uniservices Limited, Auckland (NZ)

(72) Inventors: Winston Dean John Byblow, Auckland (NZ); James William Stinear, Chicago, IL (US); Raymond Wayne Prikkel, Auckland (NZ)

(73) Assignee: Auckland Uniservices Ltd. (NZ)

( * ) Notice: Subject to any disclaimer, the term of this patent is extended or adjusted under 35 U.S.C. 154(b) by 0 days.

(21) Appl. No.: 14/253,198

(22) Filed: Apr. 15, 2014

(65) Prior Publication Data

US 2014/0287390 A1    Sep. 25, 2014

Related U.S. Application Data

(63) Continuation of application No. 14/010,673, filed on Aug. 27, 2013, now abandoned, which is a continuation of application No. 12/745,095, filed as application No. PCT/NZ2008/000323 on Nov. 28, 2008, now abandoned.

(30) Foreign Application Priority Data

Nov. 30, 2007  (NZ) ........................................ 563921

(51) Int. Cl.
*A63B 21/22*    (2006.01)
*A63B 23/14*    (2006.01)
(Continued)

(52) U.S. Cl.
CPC ................ *G09B 19/003* (2013.01); *A61H 1/00* (2013.01); *A61H 1/0274* (2013.01); *A61H 2201/1276* (2013.01)

(58) Field of Classification Search
CPC ........... A63B 21/1469; A63B 21/1465; A61H 1/0274; A61H 1/00; A61H 2201/1276
USPC ........... 482/51, 112, 131, 139, 142, 7, 71, 79, 482/92; 601/33, 27, 34, 35
See application file for complete search history.

(56) References Cited

U.S. PATENT DOCUMENTS 563,578 A    7/1896 Emerson
1,531,670 A    3/1925 Levy
(Continued)

FOREIGN PATENT DOCUMENTS

DE    102006024942    12/2007
GB    2262049 A    6/1993
(Continued)

OTHER PUBLICATIONS

U.S. Appl. No. 12/745,095, Non-Final Office Action mailed Feb. 27, 2013, 18 pgs.
(Continued)

*Primary Examiner* — Loan H Thanh
*Assistant Examiner* — Rae Fischer
(74) *Attorney, Agent, or Firm* — Schwegman Lundberg & Woessner, P.A.

(57) ABSTRACT

This invention relates to a device for controlling of movement of limbs of a user in a substantially mirror symmetrical manner, a user's limb or limbs being held in position via support arms, said device comprising a bar (or bars) adapted to move about a point of rotation, said bar (or bars) having a first end and a second end, said ends separated by the point of rotation, a first support arm(s) operatively coupled at or towards one end of said bar and a second support arm(s) operatively coupled at or towards a different end of the bar wherein the first and second support arms are adapted to substantially support and/or hold the limbs of a user of said device, the first and second support arms and the bar (or bars) configured such that, in use, as the bar (or bars) rotate(s) the support arms move in a substantially tandem synchronized manner with respect to each other.

17 Claims, 23 Drawing Sheets

(51) Int. Cl.
*A63B 23/12* (2006.01)
*A61H 99/00* (2006.01)
*G09B 19/00* (2006.01)
*A61H 1/02* (2006.01)
*A61H 1/00* (2006.01)

(56) References Cited

U.S. PATENT DOCUMENTS

| | | | |
|---|---|---|---|
| 3,756,595 | A | 9/1973 | Hague |
| 4,445,684 | A | 5/1984 | Ruff |
| 4,456,247 | A | 6/1984 | Ehrenfried |
| 4,795,150 | A | 1/1989 | Harlan |
| 5,026,049 | A | 6/1991 | Goodman |
| 5,137,504 | A * | 8/1992 | Mangini ............ 482/131 |
| D359,089 | S | 6/1995 | Taylor |
| 5,453,075 | A | 9/1995 | Bonutti et al. |
| 5,904,641 | A | 5/1999 | Huang |
| 6,050,822 | A | 4/2000 | Faughn |
| 6,352,495 | B1 | 3/2002 | Hsu |
| 7,097,600 | B2 | 8/2006 | Gray |
| 7,121,981 | B2 | 10/2006 | Whitall et al. |
| 2004/0132582 | A1 | 7/2004 | Park et al. |
| 2005/0079956 | A1 | 4/2005 | Bruno |
| 2011/0021955 | A1 | 1/2011 | Byblow et al. |
| 2013/0338546 | A1 | 12/2013 | Byblow et al. |

FOREIGN PATENT DOCUMENTS

| | | | |
|---|---|---|---|
| GB | 2435862 A | 9/2007 | |
| WO | WO-83/03357 A1 | 10/1983 | |
| WO | WO-2009/070042 A2 | 6/2009 | |

OTHER PUBLICATIONS

U.S. Appl. No. 12/745,095, Preliminary Amendment filed May 27, 2010, 6 pgs.
U.S. Appl. No. 12/745,095, Supplemental Preliminary Amendment filed Oct. 6, 2010, 6 pgs.
U.S. Appl. No. 14/010,673, Final Office Action mailed Oct. 15, 2013, 9 pgs.
U.S. Appl. No. 14/010,673, Preliminary Amendment filed Aug. 27, 2013, 3 pgs.
Great Britian Application GB1008797.1, Examination Report dated Mar. 21, 2012, 2 pgs.
Great Britian Application GB1008797.1, Examination Report dated Sep. 20, 2011, 3 pgs.
Great Britian Application GB1008797.1, Response filed Jul. 23, 2012 to Examination Report dated Mar. 21, 2012, 10 pgs.
International Application Serial No. PCT/NZ2008/000323, International Preliminary Report on Patentability dated Jun. 2, 2010, 8 pgs.
International Application Serial No. PCT/NZ2008/000323, International Search Report mailed Jun. 18, 2009, 2 pgs.
International Application Serial No. PCT/NZ2008/000323, Written Opinion mailed Jun. 18, 2009, 7 pgs.
Stinear, James W., et al., "Rhythmic Bilateral Movement Training Modulates Corticomotor Excitability and Enhances Upper Limb Motricity Poststroke: A Pilot Study", *Journal of Clinical Neurophysiology*, 21(2), (Apr. 2004), 124-131.

* cited by examiner

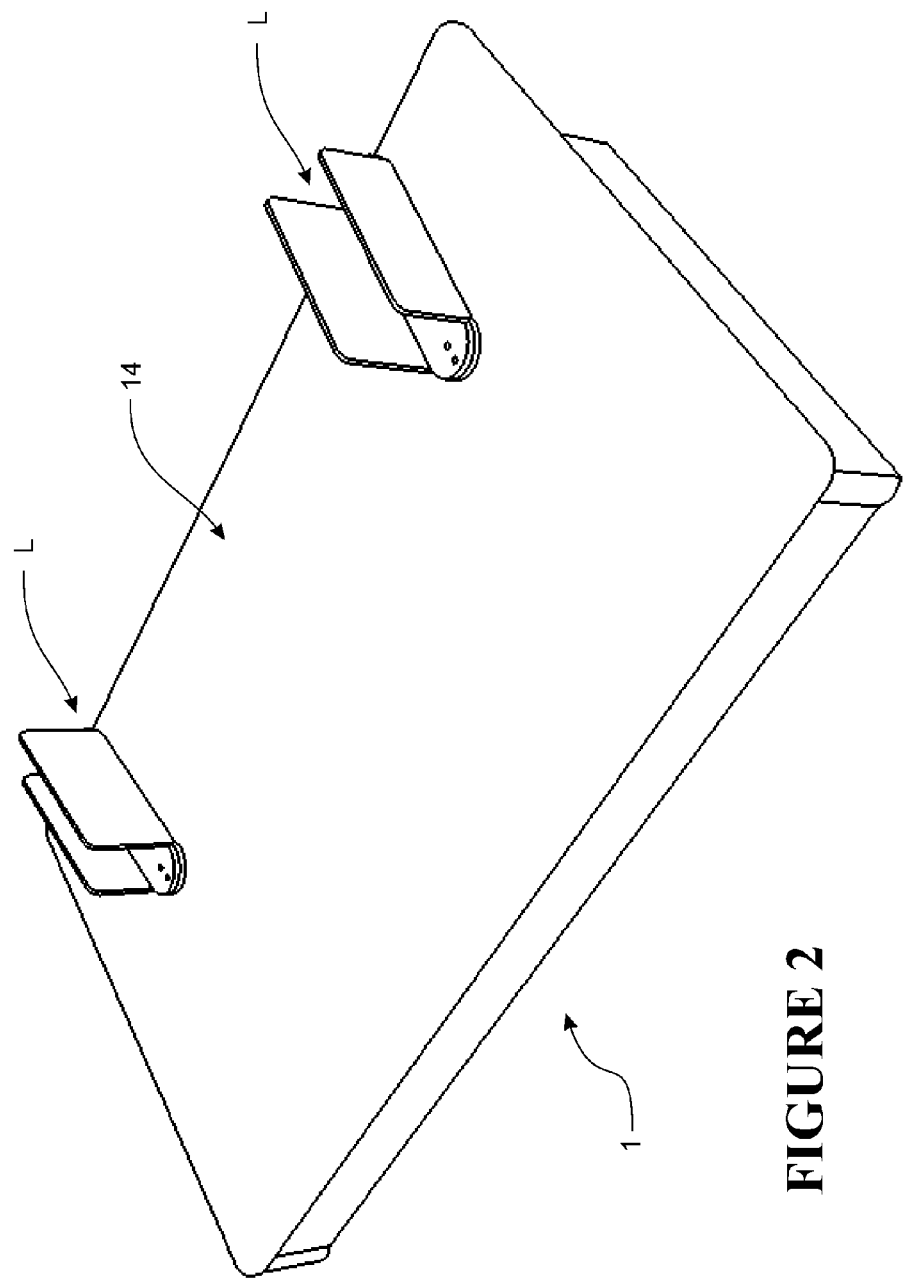

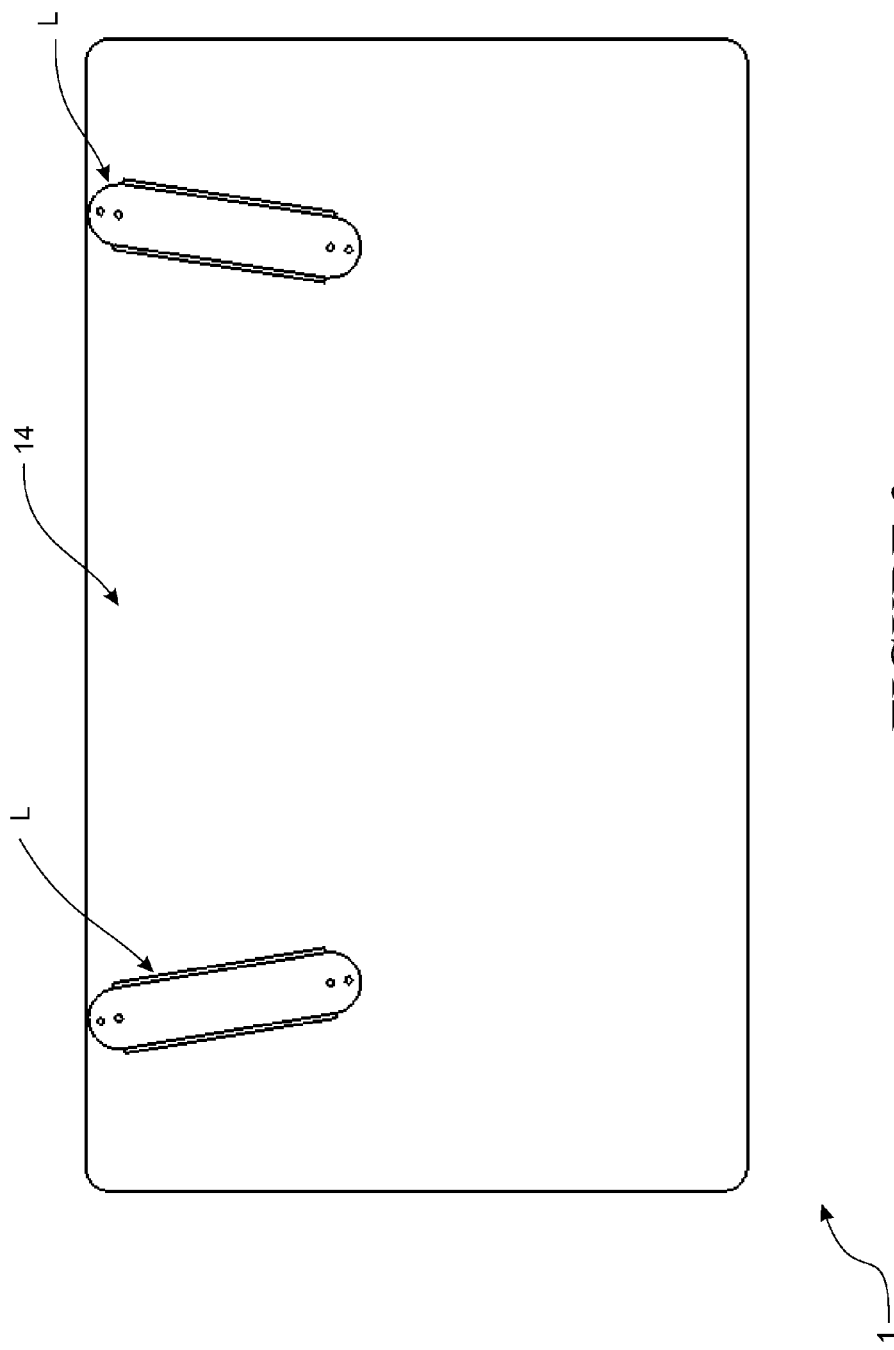

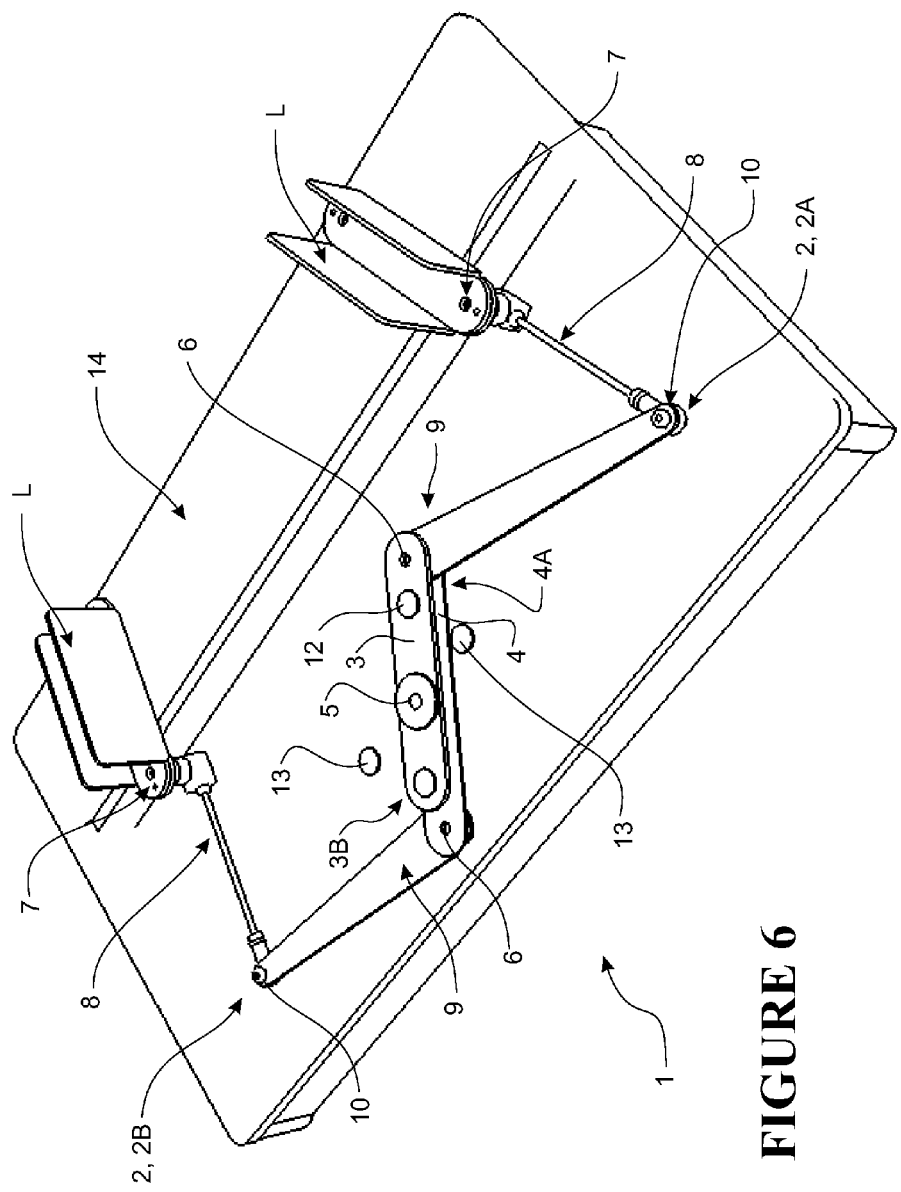

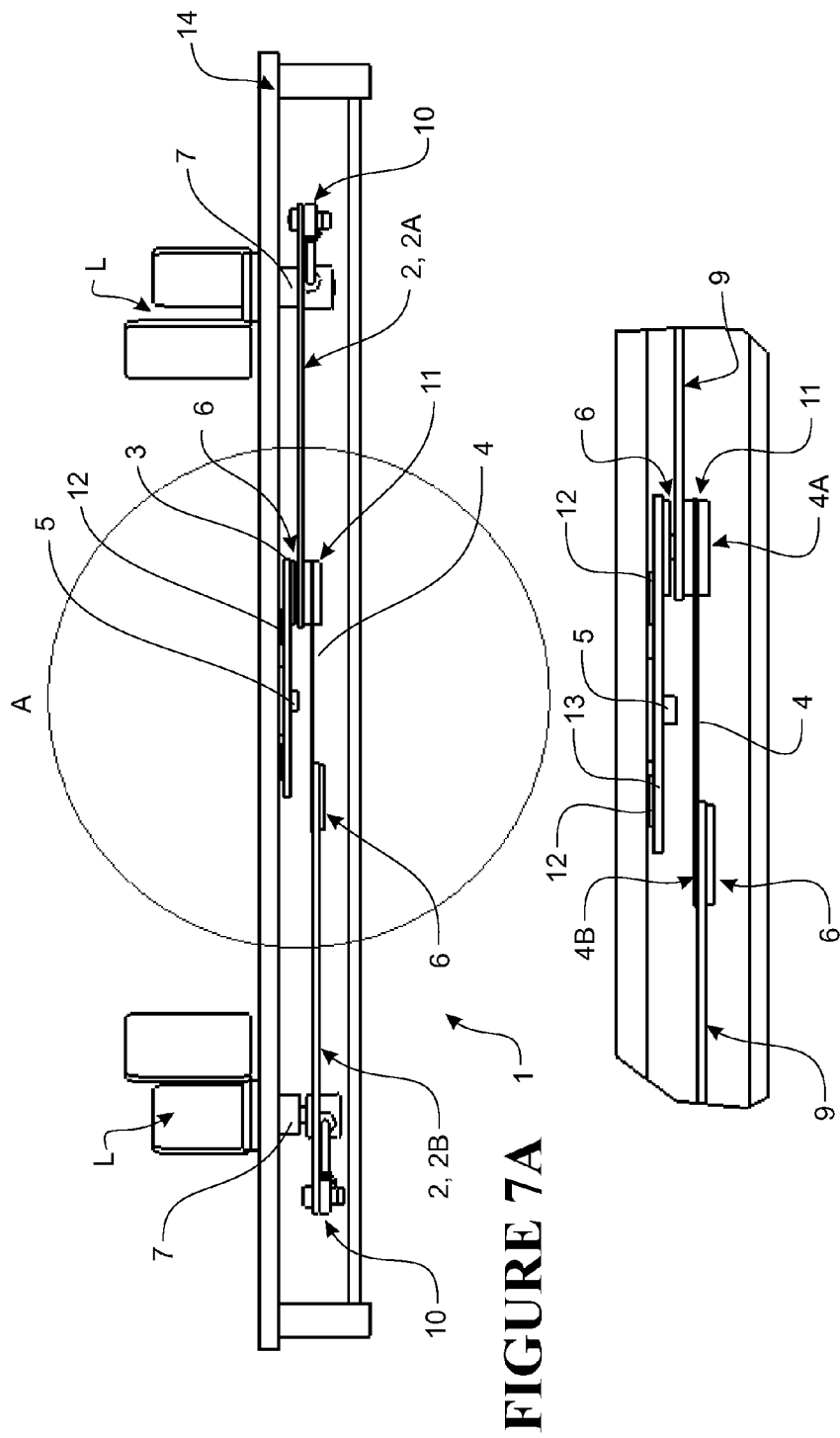

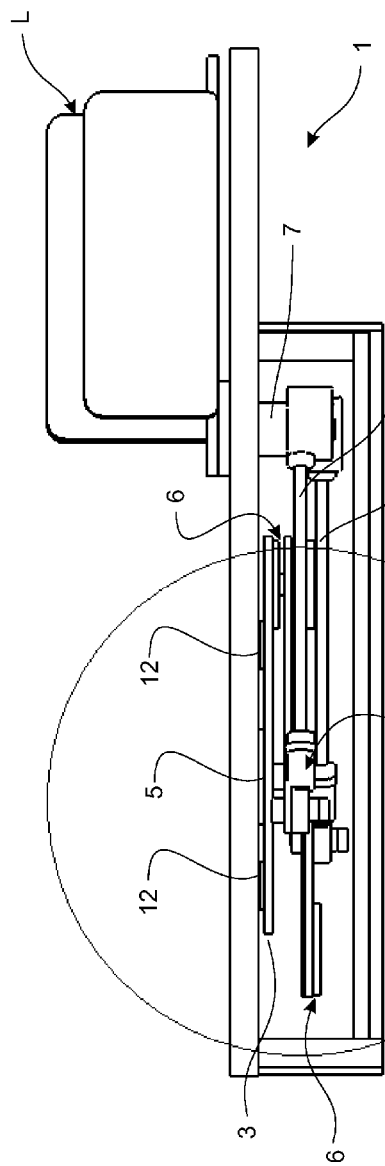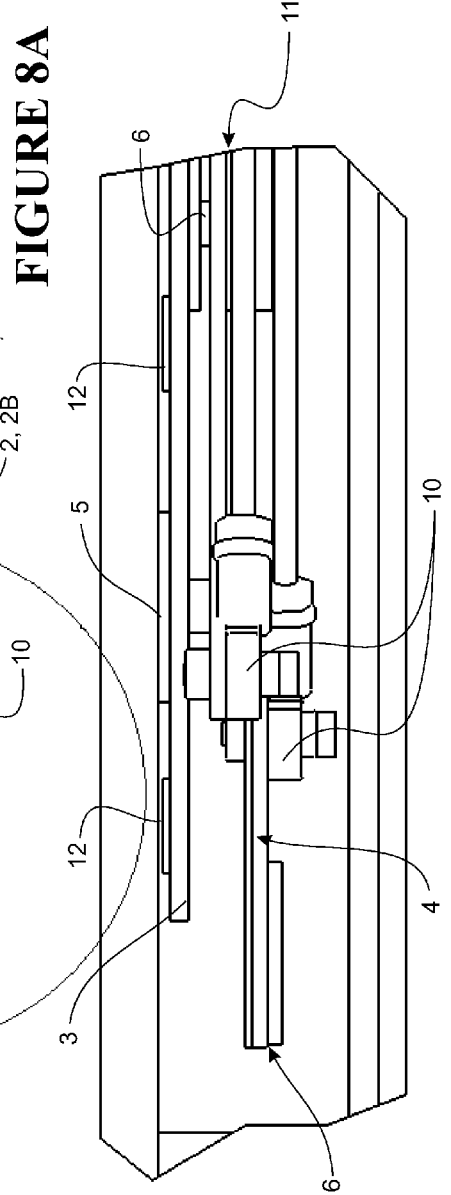

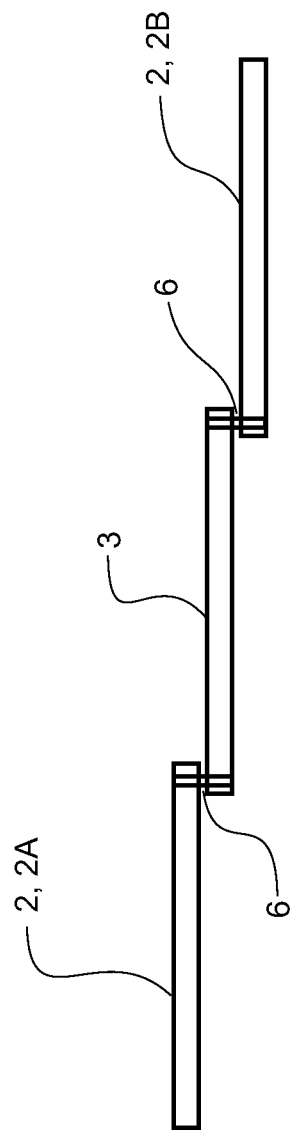

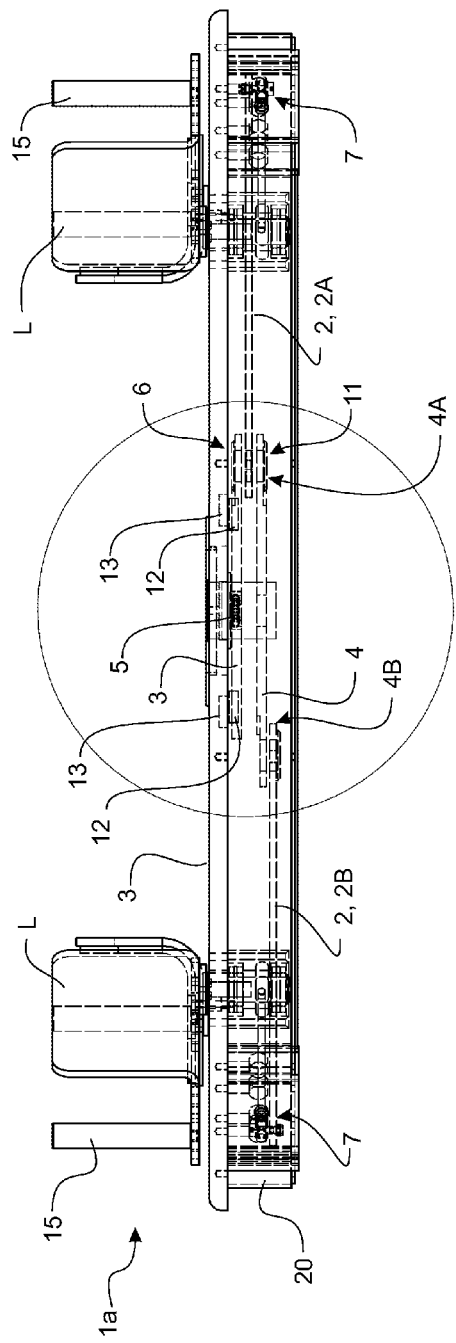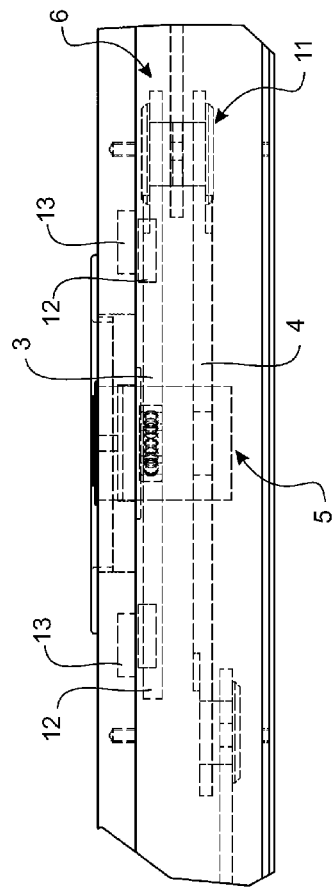
FIGURE 14A
FIGURE 14B

TRAINING DEVICE

REFERENCE TO PRIOR APPLICATION

This application is a continuation of U.S. application Ser. No. 14/010,673, which is a continuation of U.S. application Ser. No. 12/745,095, which is the U.S. national stage of International Application No. PCT/NZ2008/00323, filed Nov. 28, 2008, the entireties of which are incorporated herein by reference.

FIELD OF THE INVENTION

The present invention relates to a training device and in particular, though not solely, to a device which is adapted to provide substantially mirror symmetrical movement of at least a pair of opposing support arms.

BACKGROUND TO THE INVENTION

Rehabilitation of motor skilled impaired limbs is a desirable outcome following such impairment. For example, a stroke may be an acute clinical event, related to impairment of cerebral circulation. Acute neurologic deficits resulting from circulatory impairment can involve irreversible brain damage. The type and severity of the symptoms of such brain damage depend on a number of factors, including the location and extent of the brain tissue whose circulation has been compromised. The outcome of a stroke may vary from minimal impairment to rapid onset of coma followed by death.

Studies have shown that the incidence of stroke may be elevated by factors such as, hypertension, valvular heart disease, atrial fibrillation, hyperlipidemia, diabetes mellitus, cigarette smoking, and a familial history of stroke. Medicine is evolving efforts to try to prevent and/or minimize the risk factors associated with stroke. Unfortunately, these are preventative measures which do not address the rehabilitative needs of a stroke patient. Post-stroke rehabilitation ideally provides an environment and experience which focuses the restorative processes in the brain along the continuum of recovery.

It has been argued that bilateral movements performed in synchrony can generate neural facilitation between the cerebral hemispheres controlling the non-paretic and paretic upper-limbs. However, it not unusual for patients to have difficulty actively moving the paretic upper limb due to weakness, or other complicating factors like pasticity. Active-Passive Bilateral Therapy (APBT) relies upon a device which mechanically couples the two hands. Using APBT, stroke patients actively produce rhythmic flexion-extension of the non-paretic wrist, and mirror-symmetric movements of the paretic hand are generated through a mechanical linkage that confers an inertial advantage. During active-passive bilateral wrist flexion-extension movements, there is a measurable reduction in inhibition within the motor cortex of the passive (stroke affected) hemisphere. This reduction in inhibition is thought to arise from synchronous somatosensory feedback generated in both hemispheres by use of the device, such that the upper limbs become "functionally coupled". "Disinhibition" is a neurophysiological context which has been shown to facilitate plastic reorganisation (or re-wiring of cells) within the motor cortex. There is mounting neurophysiological evidence that APBT promotes disinhibition and re-balancing of motor cortex function in chronic stroke patients who also showed improved of upper limb function after a period of self-administered therapy preceded by APBT.

The use of any system which encourages re-training of brain functionality to in turn promote increased physical control of such an impaired limb is desirable. Where the patient of a stroke has a resultant physical impairment, such as reduced motor capabilities of a limb (for example, arm, wrist, foot, fingers or leg movement etc), re-training of brain functionality for limb control may be assisted by repetitive movements.

In a paper entitled 'Rhythmic Bilateral Movement Training Modulates Corticomotor Excitability and Enhances Upper Limb Motricity Poststroke: A Pilot Study' (*J Clin Neurophysiol* 2004; 21: 124-131), it is hypothesised that simultaneous activation of homologous muscles may promote the recovery of the function of an affected limb following a stroke. For example, bi-manual rehabilitation of opposing limbs appears to hold merit with rehabilitation efforts, for example in the re-training of brain function. Attention has been focused on systems of physical exercises which are based on small and/or repeated movement. Further, allowing a stroke patient to practice, repeatedly, the necessary movements required of a limb following impairment of such a limb may encourage the treatment of physical reconditioning and mental redevelopment. This may enable the patient to at least gain some, or an increased level of control over the impaired limb.

A device which can assist with creating or providing the above beneficial repetitive movement would be advantageous.

Therefore, one object of the present invention may be to provide a device which allows stroke patients to move their limbs, such as their hands, in way which causes changes in the balance of inhibition and excitation in the brain, allowing it to respond better to use of the affected hand after using such a device.

A further object of the present invention may be to provide a training or rehabilitative device which will go at least some way towards addressing the foregoing problems or which will at least provide the industry with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

Accordingly, in a first aspect, the present invention consists in a device comprising at least two supports, said supports being opposed to one another and configured such that operation of said device provides a substantially tandem synchronised or mirror symmetrical movement of each support arm with respect to each other.

In a second aspect, the present invention consists in a device for controlling of movement of limbs of a user in a substantially mirror symmetrical manner, a user's limb or limbs being held in position via support arms, said device comprising:
 a bar (or bars) adapted to move about a point of rotation, said bar (or bars) having a first end and a second end, said ends separated by the point of rotation,
 a first support arm(s) operatively coupled at or towards one end of said bar and a second support arm(s) operatively coupled at or towards a different end of the bar wherein the first and second support arms are adapted to substantially support and/or hold the limbs of a user of said device, the first and second support arms and the bar (or bars) configured such that, in use, as the bar (or bars) rotate(s) the supports arms move in a substantially tandem synchronised manner with respect to each other.

In a third aspect, the present invention consists in a device for controlling of movement of limbs of a user in a substantially mirror symmetrical manner, a user's limb or limbs being held in position via support arms, said device comprising:

a bar (or bars) adapted to move about a point of rotation, said bar (or bars) having a first end and a second end, said ends separated by the point of rotation, a first support arm(s) operatively coupled at or towards one end of said bar and a second support arm(s) operatively coupled at or towards a different end of the bar wherein the first and second support arms are adapted to substantially support and/or hold the limbs of a user of said device, the first and second support arms and the bar (or bars) configured such that, in use, as the bar (or bars) rotate(s) the supports arms move in a substantially tandem synchronised manner with respect to each other, and wherein the bar comprises one or more magnetic devices having an opposing magnetic field to one or more other magnetic devices located upon a substrate to which the device is attached.

In a further aspect, the present invention consists in the use of the device according to any one of the first, second or third aspects.

Preferably, with respect to each other, the support arms are controlled to move in a substantially mirror symmetrical manner.

Preferably, the point of rotation of the bar is a pivot point.

According to the present invention, more than one bar may be utilised in the device. For the purposes of this specification, reference to a first end and to a second end of a first bar also refers to the same first and second ends of a second (or more) bars used in the device. The bar (where a single bar is utilised), one of the bars (where 2 or more bars are utilised) or any combination of all of the bars (where more than 2 bars are utilised), may preferably be configured to operate as a flywheel or may be an eccentrically mounted flywheel.

Alternatively, the bar(s) may be an off-balance flywheel, or the bar(s) may have a centroid positioned at a different location to the point of rotation. Another alternative might be that the bar(s) may be weighted such that one end is heavier than the other or where the mass of the bar(s) is (are) of an unequal distribution. Preferably also, the bar or bars have a relatively high inertia, such that once the bar or bars are caused to rotate, they may continue to rotate without any significant input from a user or via any other means.

Preferably, the first support arm(s) is operatively coupled at or towards one end of said bar on a first side of the bar and a second support arm(s) is operatively coupled at or towards a different end of the bar and on a different or opposite side of the bar.

Preferably, the bar(s) can be rectangular or circular or square in longitudinal cross-section.

Preferably, the support arms comprise a limb support adapted to substantially support and/or hold and/or position the limb(s) of a user of said device.

Preferably, the limb supports may be adjustable to fit the dimensions of a user's limb(s) and/or may further comprise a limb securing means. More preferably, the limb securing means may be one or more adjustable straps, for example the type such as hook and loop straps or other releasable attachment systems.

Preferably, the limb supports are adjustable in length and width.

Preferably, the limb supports may be of a customized moulding or shape configured or a customizable moulding or shape configurable to the user's limb(s).

Preferably, the limb supports may be adjustable to fit the dimensions of a user's limb(s).

Preferably, the support arms have a distal and a proximal end, the proximal end being that which may be operatively coupled to the bar(s). More preferably, the distal ends of the support arms may pivot about a fixed point of rotation. Even more preferably, the limb supports may be positioned substantially toward or at the distal ends of the support arms.

Preferably, the limb supports may comprise a static part and a moveable part.

Preferably, the moveable part may be moveable relative the static part. More preferably, the moveable part may be connected to the support arms.

Preferably, the moveable part is connected to the support arms by a pivoting joint.

Preferably, the static part may be configured to receive a first portion of a user's limb(s) in a fixed position relative the device.

Preferably, the moveable part may be configured to receive a second portion of the user's limb(s) in a position moveable relative the device.

Preferably, the static part and moveable part may be configured relative each other to allow a user to immobilise a first portion of a limb in a static position and to immobilise a second portion of the users limb in the moveable part, the moveable part moveable by the first or second or both support arms.

Preferably, the static part and the moveable part receive and immobilise at least a portion of a user's limb(s).

Preferably, the static part may comprise a limb securing means.

Preferably, the static part is an L-shape or U-shape for receiving a portion of the user's limb. Preferably, the static part receives a forearm portion of a user.

Preferably, the moveable part receives a wrist and/or hand portion of a user.

Preferably, one or more pegs or grips or both are located on the static part or the moveable part. Optionally, pegs and/or grips are located on both the static part and the moveable part to locate a portion of a user's limb.

Preferably, the pegs or grips may be position or shape adjustable. Optionally, the pegs or grips may locate a user's limb or provide sympathetic anatomic location or positioning of a user's limb or a portion of a user's limb. The pegs or grips may optionally also be used as a hand grip.

Preferably, the support arms may be an articulated linkage. More preferably, the support arms are articulated and/or pivoting about a point between the distal and proximal ends of each of the support arms.

Preferably, the bar(s) and the support arms are arranged such that the bar may move through at least a 360° revolution uninhibited.

Preferably, the bar(s) and the support arms may be arranged in a substantially sandwich or spaced configuration. More preferably, the sandwich or spaced configuration may be a laterally spaced arrangement of each of the bar(s) and the support arms.

Preferably, the laterally spaced arrangement may be, in order of lateral spacing, the first support arm (or the second support arm), the bar(s), the second support arm (or the first support arm). More preferably, the support arms may be disposed from one another having the bar(s) located therebetween. In such an arrangement the first and second support arms may preferably be operatively coupled (towards) or substantially at different ends of the bar(s).

Alternatively, in another preferred configuration, the laterally spaced arrangement may be, in order of lateral spacing, a first bar(s), the first support arm (or the second support arm), a second bar(s), the second support arm (or the first support arm). In such an embodiment the first bar may have the first support arm operatively coupled to the first end of the first bar. The second bar may be operatively coupled to the second end (an end which is substantially different to the first end of the first bar) of the second bar. The second bar may be connected to the first bar in a manner which ensures that the first and second bars move in tandem with one another. For example, such a connection would be a static coupling.

In one particular embodiment of such a connection between the first and the second bars, the (static coupling) connection may be made at the first end of the bar and may extend internally through the operative coupling which connects the first support arm to the first bar. For example, a connection between the first and the second bars is made at the first end of the bar extending internally through the operative coupling connecting the first support arm to the first bar. In this example, the operative coupling is a rotational or pivoting coupling about which the first bar and first support arm are adjoined and which houses an internal coupling which statically connects the first bar to the second bar. In this manner, as the first and second bars are connected with one another, any movement of either the first or the second bar means the other bar will also move.

Advantageously, such configurations allow the support arms to rotate about their respective operative coupling to the bar(s). Such an operative coupling may be via a pivoting joint or connection. It will be appreciated by those skilled in the art that any such suitable coupling or joint may be appropriate which facilitates the support arms and bar(s) moving with respect to each other such that a force imputed by a user to a (or both) support arms is substantially transmitted to the bar(s). Likewise, rotation of the bar(s) about the rotational point (or pivot) should have a causal impact upon the manner of movement which is imparted to the support arms and consequentially upon the limb supports.

The bar may be of a longitudinal disposition in which the first and second ends are substantially distal of one another, separated by the bar pivot. Alternatively, the bar may be of any suitable shape, so long as the first and second support arms are appropriately operatively coupled to the bar which enables and controls the support arms to move in a substantially mirror symmetrical manner.

Preferably, in use, rotational movement of the bar is generated by imputing a driving force to one or both of the support arms and/or one or of the limb supports. More preferably, the force is substantially sufficient to initiate and/or maintain rotational movement of said bar about said pivot. Even more preferably, the driving force applied is sufficient to overcome any frictional loses.

From an alternative perspective, as the support arms are operatively connected via the bar(s), the application of a driving force to (at least) one of the support arms will operate the device such that the remaining (or other) support arm is moved in a substantially tandem manner. In particular, the support arms move in a mirror symmetrical manner with respect to each other. The motion of the support arms is transmitted to the bar(s) resulting in the application of a torque to the bar(s) about the point of rotation (or pivot point). The bar(s) are caused to rotate. In this manner, where the bar(s) are of a flywheel or similar configuration, once sufficient rotational momentum of the bar(s) is achieved, the momentum may desirably be sufficient to help maintain bar(s) rotation and thereby movement of the support arms.

Preferably, low friction material may be utilised between any joint or pivoting part of the device. More preferably, low frictional couplings and connections are utilised which enable the bar or bars to freely rotate once momentum has been provided. Even more preferably, the bar or bars have a relatively high inertia such that, in use, once the bar or bars are rotating, there may be substantially minimal frictional losses from the device.

Preferably, said support arms and/or the bar further comprise a torque assisting or gearing system enabling minimum user force input to achieve bar(s) rotation. More preferably, such a torque assist or gearing system is configured to reduce the input force required to initiate and/or maintain rotation of the bar.

Preferably, the bar may comprise one or more magnetic devices having an opposing magnetic field to one or more other magnetic devices located upon a substrate to which the device may itself be attached. Preferably, the one or more other magnetic devices are located in a substantially commensurate position or proximity to the bar's opposing magnetic devices that the respective magnetic fields oppose and interfere with one another. For example, the one or more other magnetic devices are located in a substantially commensurate position or proximity such that the respective magnetic fields of those magnetic devices upon the bar and the substrate oppose and interfere with one another. Such magnetic field interference preferably yields propulsion of the bar which may aid rotational movement. For example, fixed earth or permanent magnets may be utilised, all either being N-N (North-North) relationships or S-S (South-South) relationships. Alternatively, the magnetic means may be an electromagnetic system. Such a system may be operatively controlled such that that generated electromagnetic pulses are generated which are used to assist with the rotational propulsion of the bar.

Alternatively, the one or more magnetic means may preferably be used to prevent a "stall" configuration of the bar(s) and support arms. In other words, the positioning of the one or more magnetic devices may be such that application of a driving force to the bar(s) via the support arms is transmitted in a manner which results in application of torque to the bar(s). For example, the magnetic devices preferably ensure that the direction of the forces applied to the bar(s) via the support arms may not be substantially aligned.

In another alternative, preferably a direct drive means is connected to the bar(s) or to one or both of the support arms. For example, rotation of the bar may be initiated or assisted by provision of a direct drive means. Preferably, such a direct drive means may comprise an electric motor means or may comprise a manually manipulated drive handle, such as a crank, operated by a third party (i.e. a non-user of the device). Such a direct drive means may be connected to the bar(s) or to one or both of the support arms.

Preferably, the device comprises a surface having a working side and an operational side. More preferably, the working side locates the limb supports and the operational side locates the bar or bars and the first and second support arms.

Preferably, the device comprising a counter, the counter being indicative of a number of mirror symmetrical limb movements performed by the device or the user. More preferably, the counter is selected one or more of: a mechanical counter, an electrical or digital display counter, the counter receiving mirror symmetrical limb movement information via a sensor. Even more preferably, wherein the sensor is a mechanical or a digital or an optical sensing system.

Preferably, the device is portable.

Preferably, the device has a handle or handles. For example, these may be device carry handles.

As used herein the term "and/or" means "and" or "or", or both.

As used herein "(s)" following a noun means the plural and/or singular forms of the noun.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

This invention may also be said to broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Further aspects of the present invention and other preferred embodiments may become apparent from the following description which is given by way of example only and with reference to the accompanying drawings in which:

FIG. 2 is a plan perspective view of one embodiment of a device according to the invention, FIG. 3 is a plan view of one embodiment of a device according to the invention, FIG. 6 is another embodiment of the device according to FIG. 5, FIG. 7A is a sectional elevation view from the rear of one embodiment of a device according to the invention, FIG. 7B is an enlarged view of the section circumscribed in FIG. 7A, FIG. 8A is a sectional side elevation view of one embodiment of a device according to the invention, FIG. 8B is an enlarged view of the section circumscribed in FIG. 8A, FIG. 9 is a partial elevation view of a partial segment of another embodiment according to the invention, FIG. 14A is a sectional elevation view from the rear of one embodiment of a device according to the invention, FIG. 14B is an enlarged view of the section circumscribed in FIG. 14A.

DETAILED DESCRIPTION OF PREFERRED EMBODIMENTS

Figure 1A:
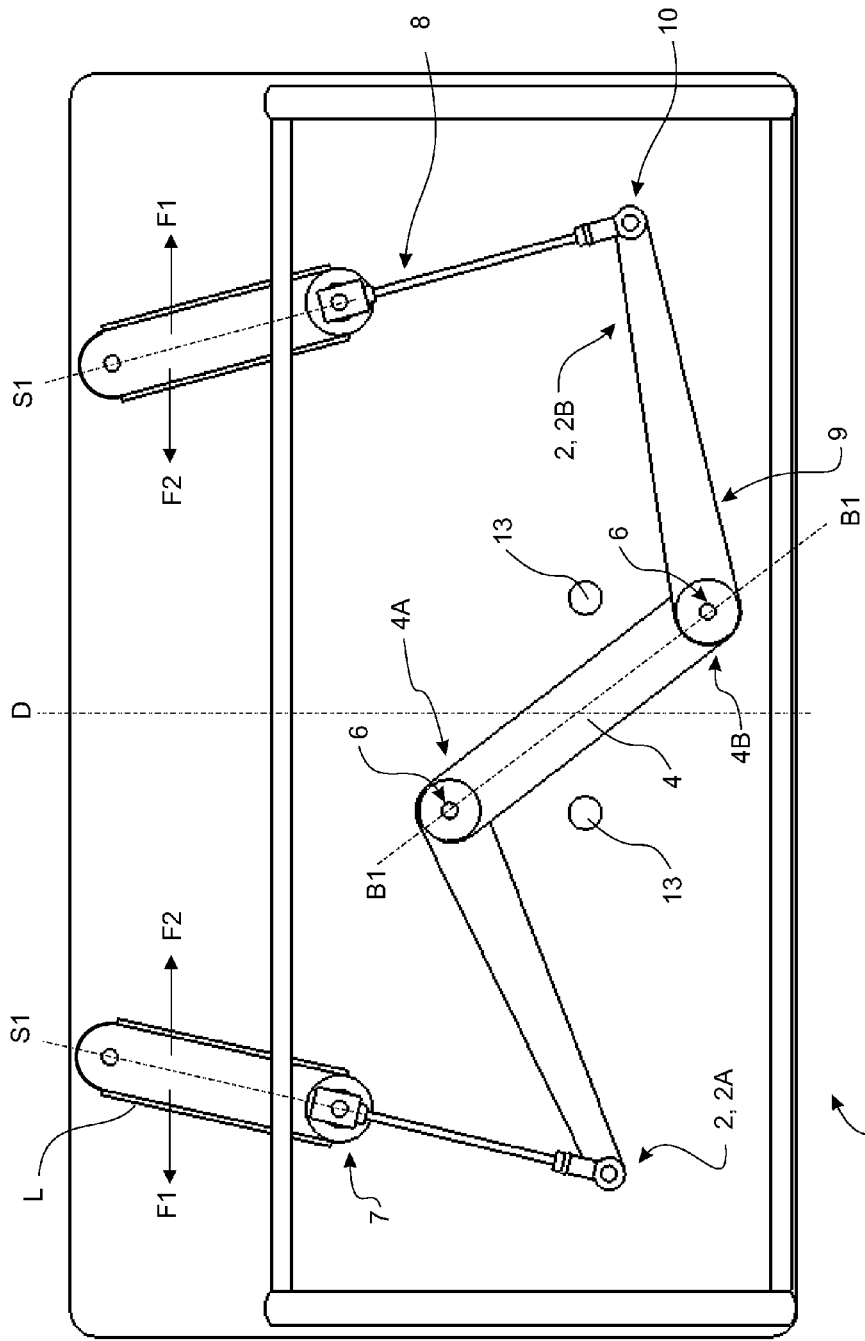
FIG. 1A is a plan view from underneath one embodiment of a device according to the invention, in a partially rotated position.

The invention is designed to provide constrain the limb or limbs of a user of the device in a manner which allows repetitious substantially mirror symmetrical movement. The device is also designed to substantially minimise the overall energy input requirements of the user. Over compensatory physical stimulation of one limb over the opposing limb is not preferred. Ideally, use of the device aids in the rehabilitation of stroke patients who as a consequence of the stroke have suffered reduced control of a limb or limbs.

"Tandem synchronised movement" or "mirror symmetrical movement" are terms used to describe the type of motion which the limbs of a user of the device are subjected to when the device is in operation. Such movement or motion is that in which the portions of the support arms, such as the limb supports, which support the limbs of a user are constrained by the device to allow a motion such that the limb supports (and thus the user's limbs) are controlled to move at the same time in an opposed manner. For example, as a first support arm limb support moves towards a centre line, so too does the second support arm limb support. The movement of each support arm limb support mirrors that of the other. In this manner, in use, a user's limbs are controlled to both substantially simultaneously move in either a direction toward each other, or substantially simultaneously move in a direction away from each other.

In addition, where a user has only one limb, for example where an amputee has had a stroke and is then using the device, the term "tandem synchronised movement" or "mirror symmetrical movement" refer to a "cyclical reciprocating movement" of the single limb. Because of the design of the device, these terms also describe the motion of the portions of the support arms which hold a user's limb or limbs in position, with respect to each other. This motion could also be described as a diametrically opposed movement.

For example, where a user has two arms (the left and right arm "limbs") held in position by the support arms, when the device is in operation, the left and right arms are constrained by the device to only move toward one another, or away from one another. In one simplified example, as a user moves their left arm towards the centreline of their body the mirror symmetrical movement would be the right arm also moving towards the centreline of their body. Thus, reference to "limbs" may also be used be used in relation to a single limb.

It is considered that small and/or repeated cyclical movement of limbs in a mirror symmetrical manner can beneficially aid corticomotor excitability in post-stroke patients. Simultaneous activation of homologous muscles may help promote the recovery of the function of an affected limb from a stroke incident. It may also help to re-train or further develop specific brain function associated with movement of an impaired limb. In the invention it is desirable to create a mirror symmetrical movement of opposing limbs.

Such mirror symmetrical movement ensures that the muscle groups required to move one of the limbs in one direction are the same muscles groups which would normally be activated the second (impaired) limb. It will be appreciated that the muscle groups and/or control of such muscle groups may be compromised following a stroke incident and that it is primarily the control of these muscle groups which the device is preferably designed to improve.

In one aspect, the invention is designed to aid in the rehabilitation of control of stroke patient impaired limbs by the repetitious cyclical movement of a user's limb or limbs. The cyclical movement of a user's limb or limbs may help to retrain or excite portions of the brain associated with the functional motion and control of a limb, in particular of the impaired limb(s). The cyclical movement referred to above is preferably a mirror symmetrical movement.

A first embodiment of the invention shall now be described with reference to FIGS. 1-9. The discussion below is applicable to a second embodiment of the invention, for example illustrated with reference to FIGS. 10-15B.

For the purposes of the discussion below it will be helpful to note FIGS. 1A-1D illustrate a view from underneath device (1) and FIGS. 10A-10F illustrate a bottom view of device (1a).

Figure 5:
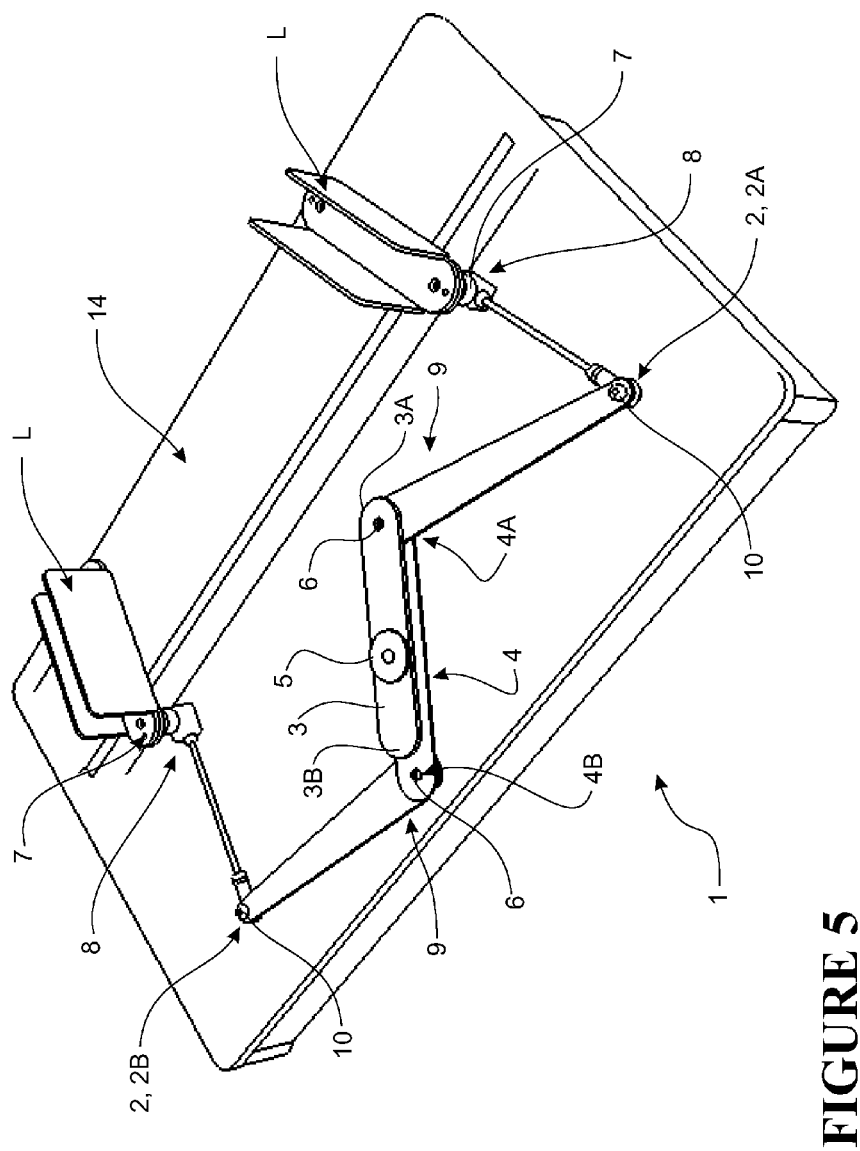
FIG. 5 is a cut-away perspective view from the top side of one embodiment of a device according to the invention.
Figure 10A:
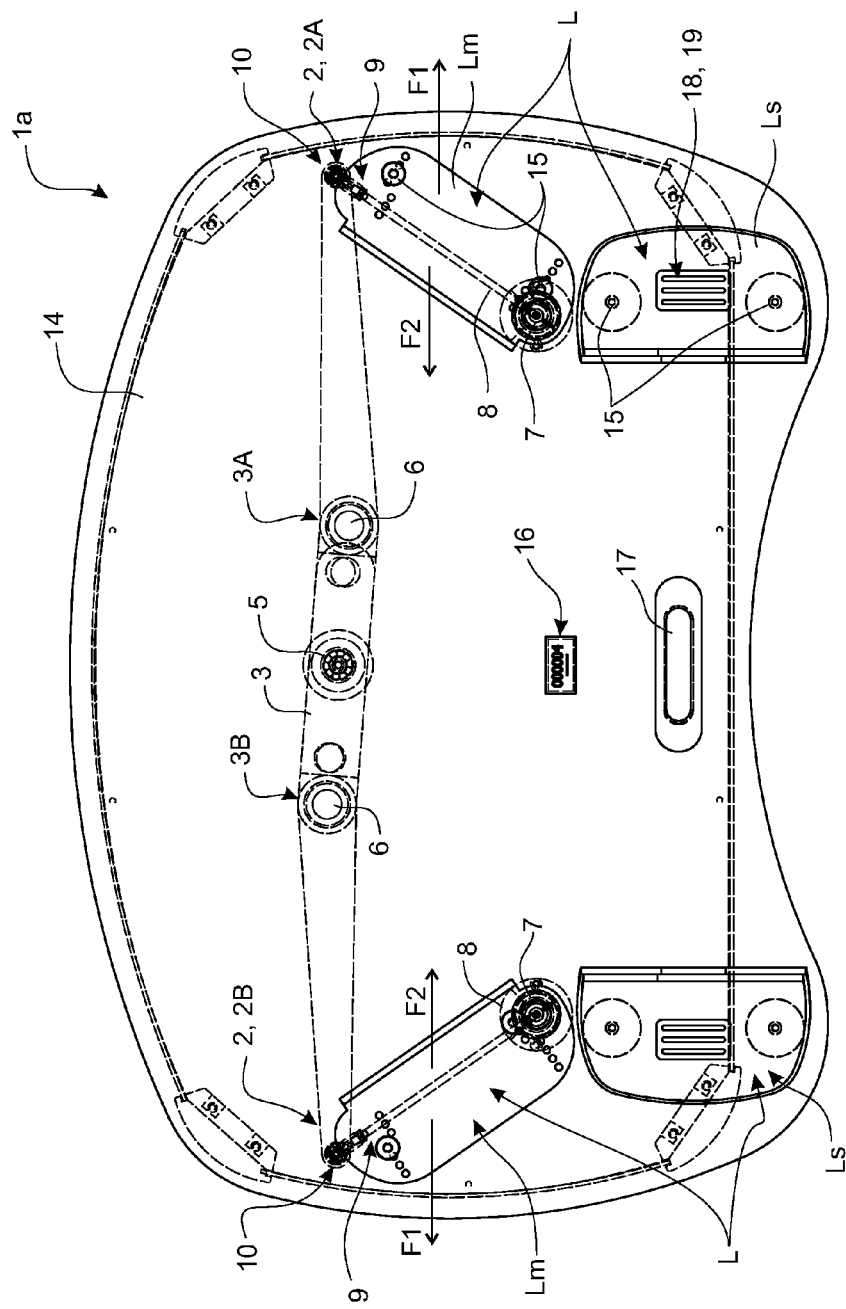
FIGS. 10A-10F illustrate a plan view of one embodiment of a device according to the invention, in variously partially rotated positions A-F.
Figure 10B:
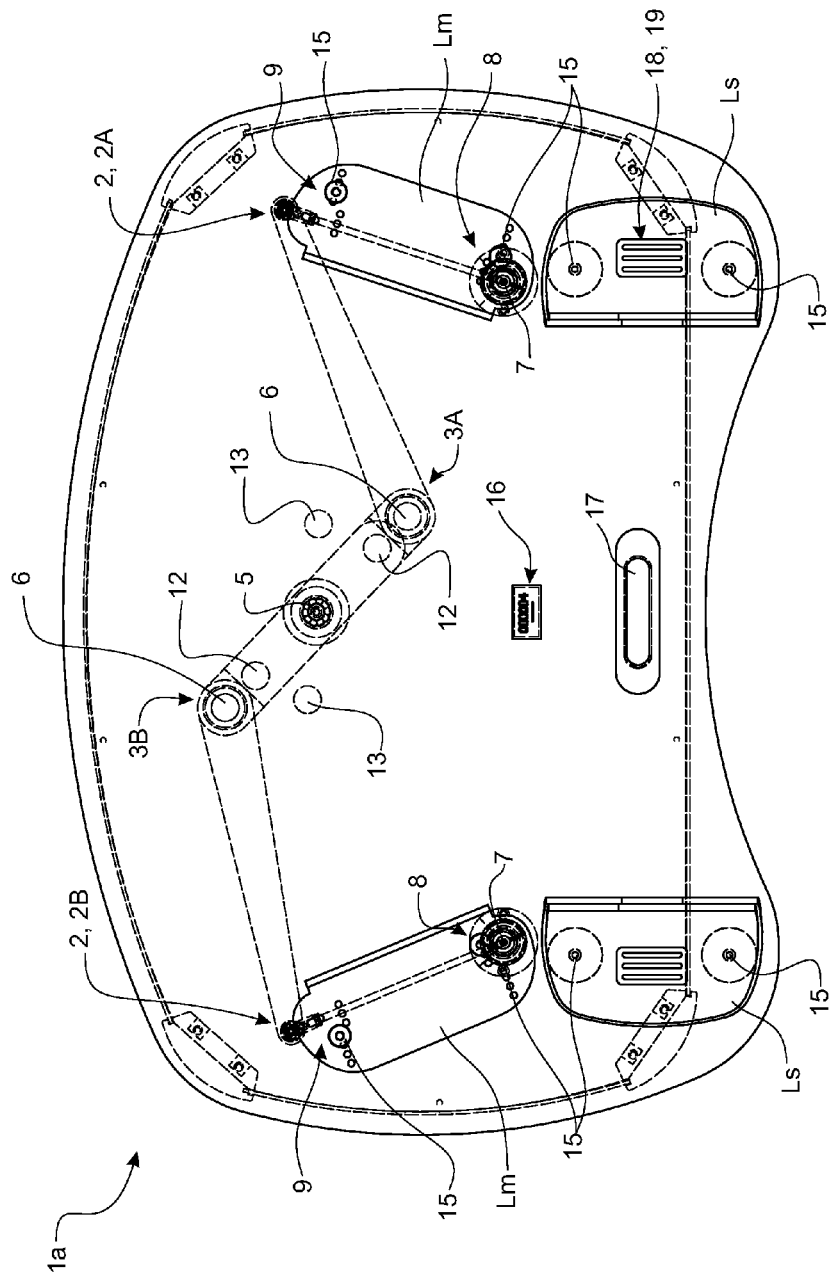
Figure 10C:
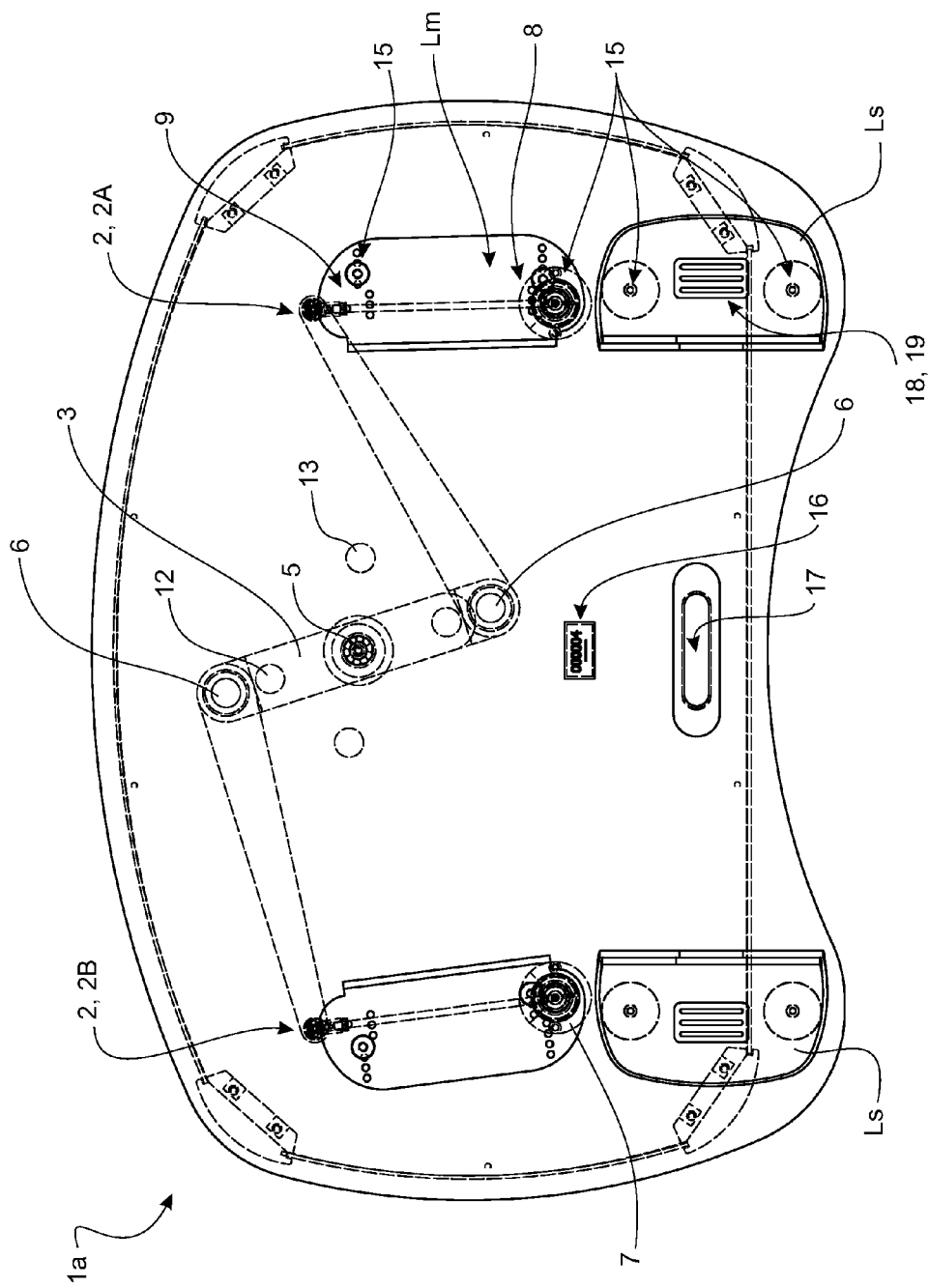
Figure 10D:
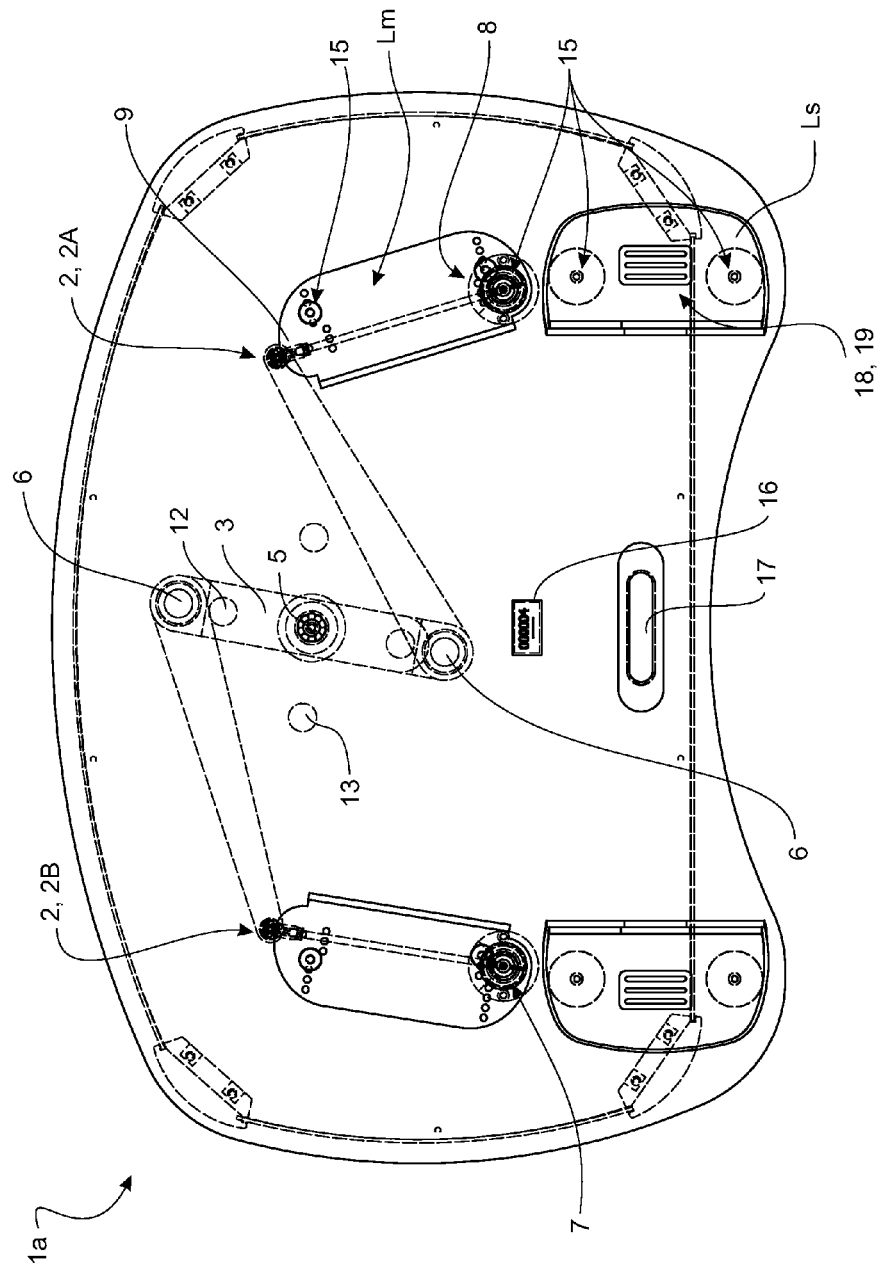
Figure 10E:
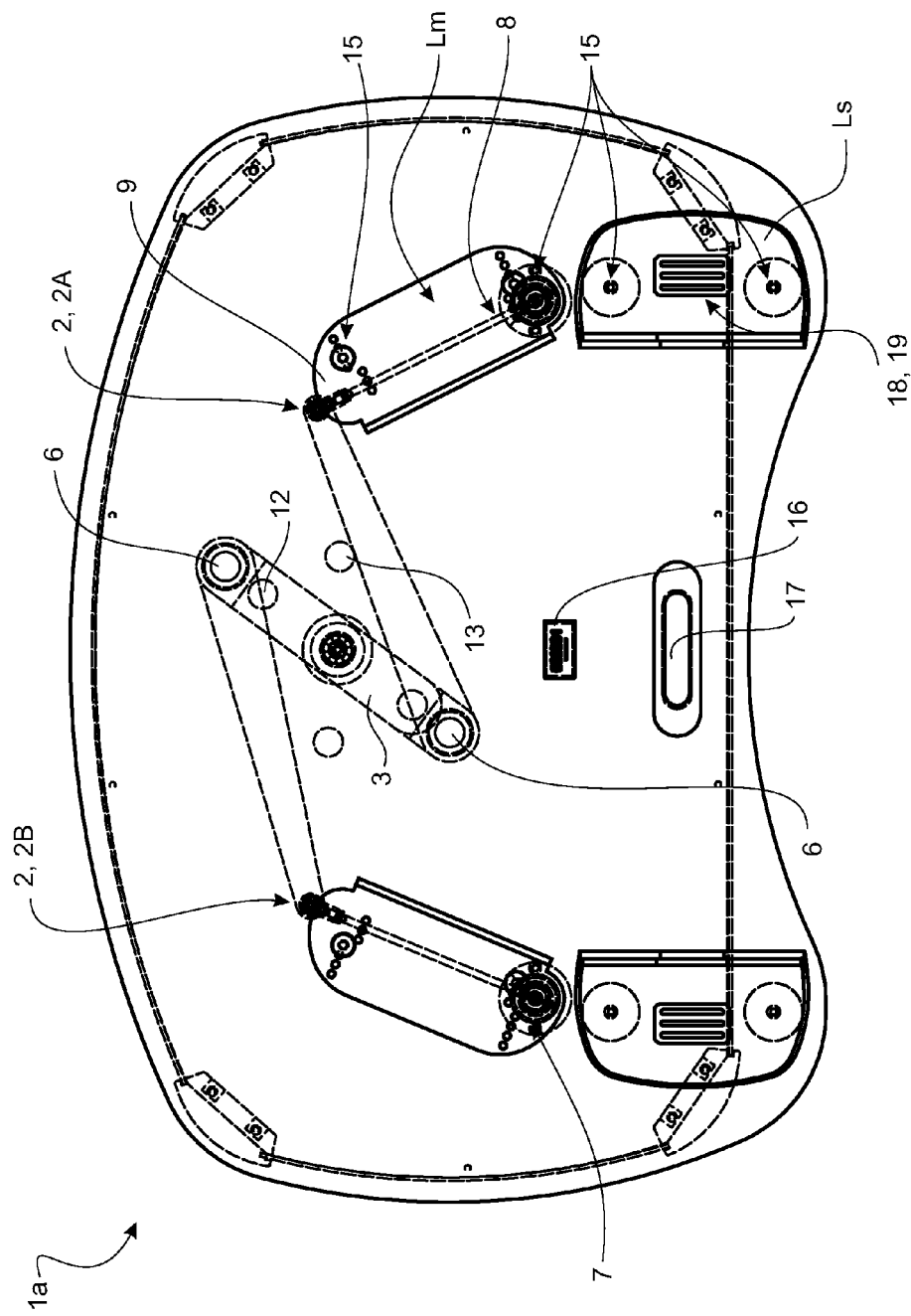
Figure 10F:
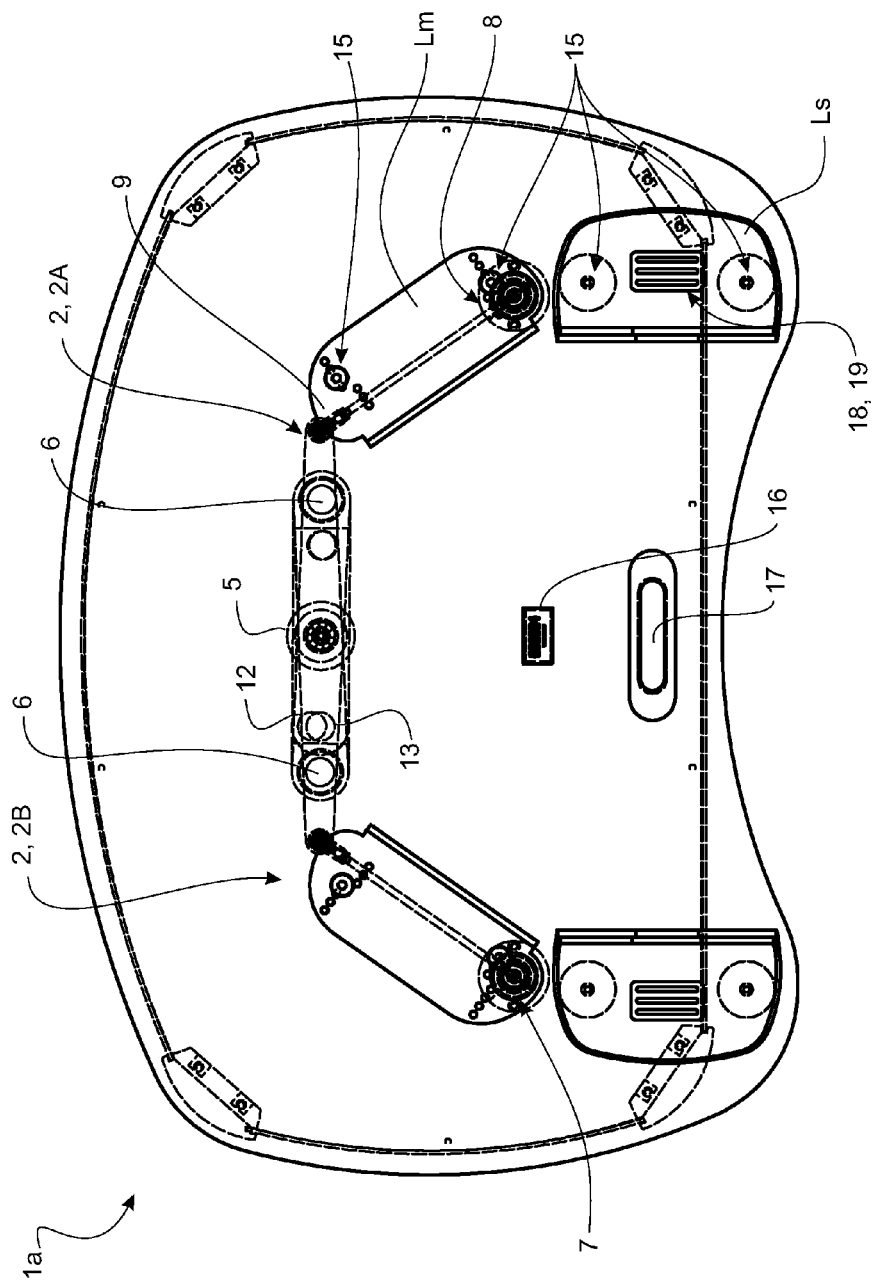
Figure 11:
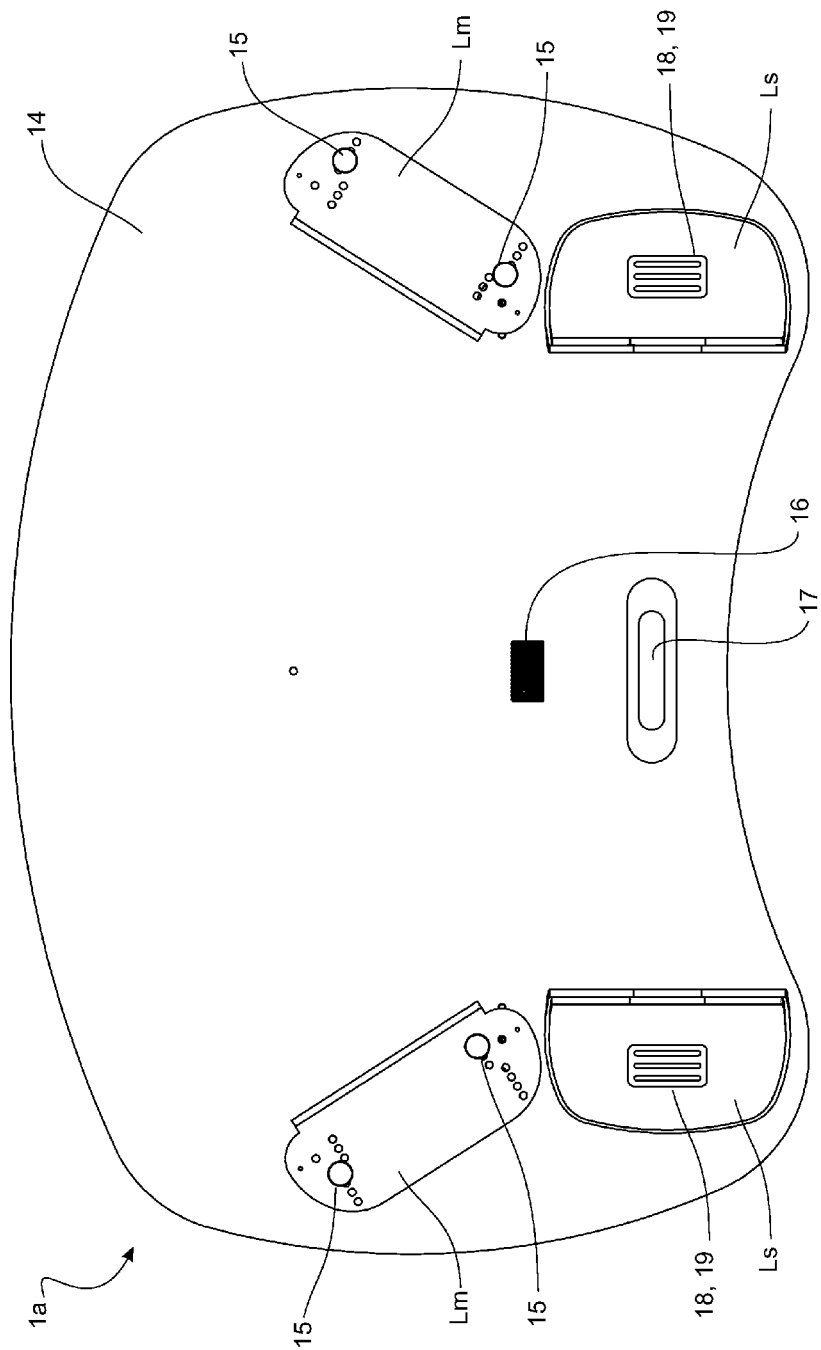
FIG. 11 is a plan view of one embodiment of a device according to the invention.
Figure 12:
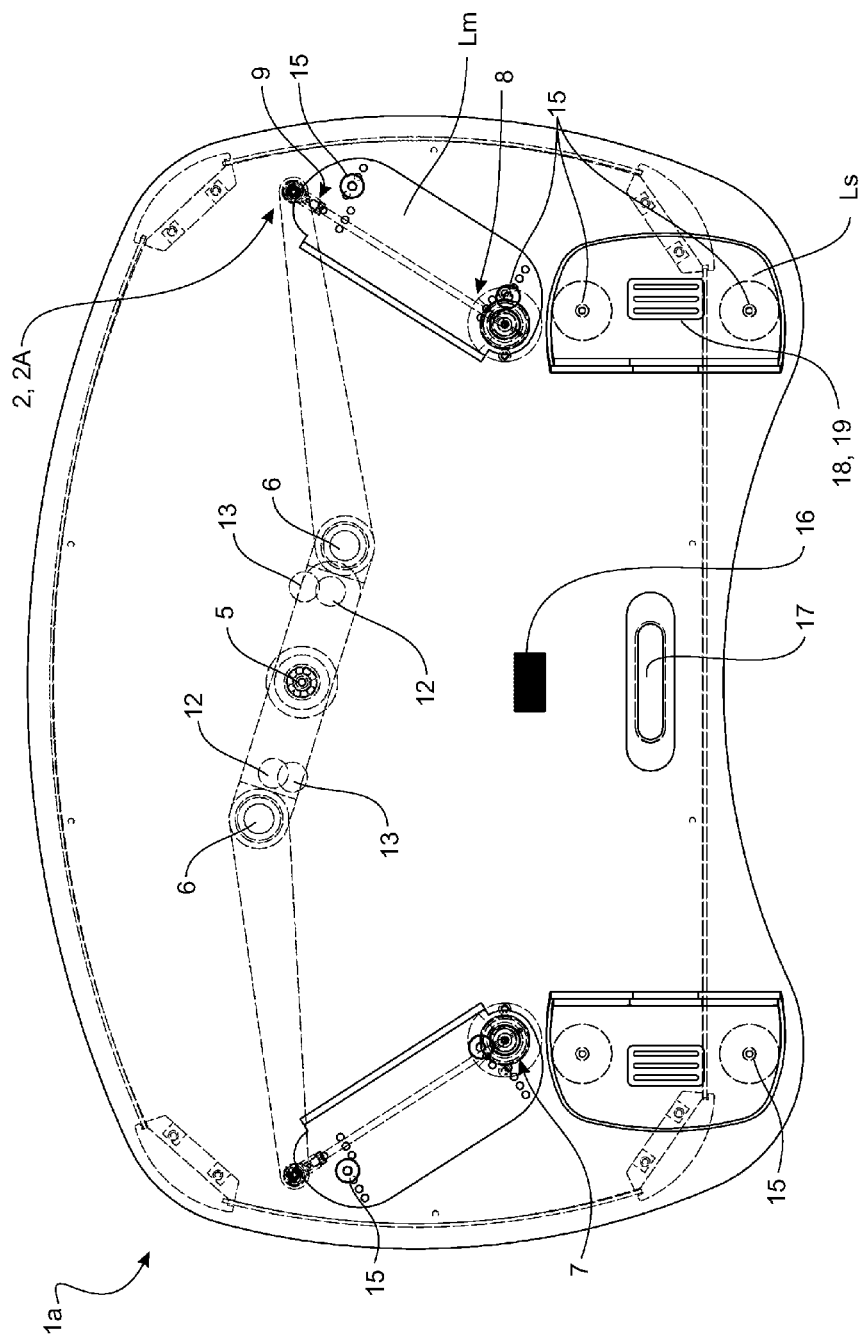
FIG. 12 is a cut-away plan view of one embodiment of a device according to the invention.

FIG. 5 illustrates a device (1) adapted for controlling or constraining the movement of the limbs of a user (not shown) in a substantially tandem synchronised or mirror symmetrical manner with respect to each other. A user's limbs may be held in position via limb supports (L) connected to the support arms (2). The device (1) has a first bar (3) and a second bar (4) which are adapted to move about a point of rotation, such as a pivot (5). Pivot (5) may be a fixed point of rotation.

The first bar (3) has a first end (3A) and a second end (3B). The second bar (4) has a first end (4A) and a second end (4B). The first ends (3A, 4A) and the second ends (3B, 4B) of the bars (3, 4) are separated by the point of rotation, such as pivot (5).

There may be two support arms, a first support arm (2A) and a second support arm (2B). The first support arm (2A) is operatively coupled to the first end (3A) of the first bar (3), while the second support arm (2B) is operatively coupled to the second end (4B) of the second bar (4). These operative couplings are shown as pivotal couplings (6) in the drawings.

The support arms (2) may also pivot about a fixed pivot point (7). The support arms (2) have a distal end (8) and a proximal end (9). In the embodiment shown in FIGS. 1A-1D, FIGS. 5-8, FIGS. 10A-10F, and FIGS. 12-15B the proximal end (9) is operatively coupled to the bars (3, 4) and the distal end (8) pivots about the fixed pivot point (7). The limb supports (L) are positioned substantially toward or at the distal ends (8) of the bars (3, 4).

The support arms (2) are also shown as being of an articulated form, for the purposes of this description. An articulated joint (10) is positioned between the distal end (8) and the proximal end (9) of the support arms (2).

Referring now to FIGS. 1A to 1D, and 5, when a user applies a force to either one of or both of the support arms (2A, 2B), for example in the direction indicated by arrows F1 or F2, this force is substantially transmitted to an end or ends (3A and/or 4B) of the bars (3, 4). This in turn generates a torque on the bars (3, 4) about the pivot (5) and, if the torque is sufficient to overcome frictional losses of the device (1), then the bars (3, 4) are induced to rotate. The bars (3, 4) are enabled to rotate either clockwise or anti-clockwise about the pivot (5). The direction of rotation of the bars (3, 4) depends upon the direction of the resultant torque applied to the bars (3, 4).

The bars (3, 4) are connected to each another such that they move in tandem. The second bar (4) is connected to the first bar (3) via a static coupling (details not shown) (11).

As the support arms (2A, 2B) are each coupled substantially at or towards different ends of the bars (3, 4), the support arms also move in a tandem manner with one another as the bar rotates. As a consequence, an imputed force from a user to a support arm directly causes the other support arm to also move.

Force can be applied directly to the support arms (2) by the user. This is referred to as a direct input of force. Direct input of force may also be combined with an indirect input of force to the device. Indirect inputs may be provided either to one or both of the support arms (2) and/or to one or both of the bars (3, 4). Although not shown, such indirect force inputs may be, for example provided by one or more of a motor means, a third party assisting the user of the device, a crank handle attached to the bar (3) to induce or assist with bar rotation, or any other such device which reduces the total force required by a user to initiate rotation of the bars (3, 4).

Referring now to FIG. 6, in another alternative, and which may be coupled or synchronised with any one of the above force input means, an electromagnetic means (also not shown) may be incorporated into the device (1). For example, such an electromagnetic means can be used to apply magnetic impulses to one or both of the bars (3, 4) and/or to one or both of the support arms (2) in the form of magnetic attraction/propulsion as needed. Such an electromagnetic means may be used to assist a user with direct force inputs in order to minimise the total direct input force required for operation of the device (1).

Yet a further alternative may be the use of a set of one or more permanent magnets (13) affixed to, or incorporated into the bar or bars (3, 4) and a corresponding set of the same magnetic field permanent magnets (13) affixed to, or incorporated into a portion of the device (1), such as a desk type arrangement (14). The magnets being arranged and positioned such that as the bars (3, 4) rotate the magnetic fields of the magnets interfere with each other given their commensurate magnetic polarities (i.e. all north (N) or all south (S) magnets are used). Such a system could also be an electromagnetic system such that the polarities of the magnets are charged sequentially as the bar rotates in order to provide both a "pull" of the bar towards the next magnetic position and then a "push" or propulsion of the bar as it is appropriately aligned with or near to the magnetic positions.

In another embodiment, the bars (3, 4) are an inertia or momentum wheel. Advantageously, once the bars (3, 4) have been provided with sufficient force to consequently initiate rotation, the bars (3, 4) have sufficient inertia and momentum to continue in rotation. Of course, there may be frictional losses in such a system; however these are ideally minimised by the use of low friction couplings, joints and suitable connections. Likewise, lubricants can be utilised where appropriate to minimise friction in the device. It is also considered that the inertia and thus rotational momentum of the bars is sufficient such that once the bars are caused to rotate, they shall continue to rotate with only a minimal amount of further input force from a user (or other means) to the device.

Minimising user fatigue of the device (1) is a preferred outcome, especially as it is considered that a stroke patient using such a device will be required to undertake many repetitions. It is also a desirable outcome of using the device that the side of the brain which is affected by a stroke is not over-exerted by driving the device. Instead, it is preferred that the device allows a "balance" between the two sides of the brain (left and right hemispheres).

In the above manner, as with the remainder of the description of the invention, it is a focus that a user is not required to continually and substantially impute driving force into the support arms (2) to maintain bar rotation. It is desired that the user of the device is provided with repeated tandem synchronised/mirror symmetrical movement of their limbs. More advantageously, such repeated movement of limbs aids in the changes in the balance of inhibition and excitation in the brain, allowing it to respond better to use of the affected limb (such as a hand) after using such a device (1).

The above systems are also beneficial as they can be utilised to prevent "stall" positions between the bars (3, 4) and support arms (2) from occurring. This is especially useful when the device is in a static mode (i.e. unused and stationary) as then any force applied via the support arms is able to be transmitted and translated into a torque about the pivot (5) of the bars (3, 4). A "stall" position would be when the bars (3, 4) and support arms (2) are positioned in a manner such that the direction of force applied to the bar from the support arms are aligned. Such as that where the bars (3, 4) are at the rotated position B3 or B6. It is desirable that, from a start or stationary position, the bars (3, 4) and support arms (2) are not in a stall position so that user can, without setting up the device themselves, begin to operate the device (1). In this manner, the device (1) would always be in an appropriate bar (3, 4) and support arm (2) configuration.

It is also desirable that, in the case of permanent magnets being used, the magnetic force is sufficiently minimal that is does not have a significant impact or inhibition upon the rotation of the bars (3, 4). This is a further example of where rotational momentum of the bars (3, 4) may be advantageous. Ideally the momentum of the bars (3, 4) is sufficient to carry the bars (3, 4) past any magnetic interference during operation of the device (1), but the magnetic interference is sufficient to propel the bars (3, 4) out of a stall position once the device (1) (more particularly once the bars (3, 4) and support arms (2)) is stationary.

In the manner described above, both from direct force inputs, indirect force inputs as well as from a combination of both, the device (1) preferably minimises the total amount of force/energy required to maintain the bars (3, 4) in rotation. This may be further achieved by the use of low frictional materials, such as PTFE (polytetrafluroethylene) and/or lubricants between joints and couplings.

One or both of the bars (3, 4) may have an uneven weight distribution, is an off-balance or eccentrically mounted flywheel. It is envisaged that once the bars (3, 4) begin to rotate the bars (3, 4) have sufficient momentum to act as a flywheel. Such a flywheel effect allows a user of the device (1) to then only apply small increments of force/energy to the device to maintain rotation of the bars (3, 4). This is where low frictional contacts and/or indirect force inputs may also be of assistance in maintaining bar (3) rotation. In this manner, the user does not need to constantly input a force which is equivalent to that required to begin rotation of the bars (3, 4), consequently the user does not develop over compensatory control or muscle development of the limb which is (perhaps initially) providing most of the direct input force.

FIG. 2 simply illustrates one particular embodiment of the device's limb supports (L). The limb supports (L) are connected to the support arms (2) in a manner which allows the transmission of force applied by a user. A user can place their forearms, wrists (i.e. limbs) within the cavities of the limb supports (L). Although not shown, such limb supports (L) can also include adjustable straps or be appropriately configured to be customised to a user's limb shape. This may be particularly advantageous where many repeated cycles of the device are undertaken, as is anticipated by such a device. In this embodiment, the limb supports (L) are shown as being located on the top side of for example, a desk or flat surface (14).

FIGS. 10A-15B further illustrate limb supports (L) comprising of a static part ($L_s$) and a moveable part ($L_m$). The static part ($L_s$) can locate a forearm portion of a user's limb, while the moveable part ($L_m$) can locate a wrist or hand portion of the user's limb. Adjustable pegs or grips (15) can be located on the static part or moveable parts. These pegs or grips may be upstanding and position adjustable for accommodating a user's limb. The pegs or grips (15) can also be conformable to a user's limb dimensions. Anatomic fitment of a user's limb may be particularly advantageous for comfort purposes and for securely aiding to restrain a user's limb on the limb support (L).

Advantageously, the pegs or grips (15) can be moved to different positions on the limb supports (L), for example of the moveable limb support ($L_m$). Re-positioning of the pegs or grips (15) can be achieved via locator holes into which the pegs or grips can be inserted or screwed or otherwise connectably attached.

Although not shown, a limb securing means (not shown) can also be used to further restrain a user's limb on a limb support (L). For example, a limb securing means may include a releasable attachment system, such as an adjustable tensioning strap or a hook and loop type strap arrangement.

The limb supports (L) or portions of the limb supports (L) can be configured or can be conformable to a user's limb shape and configuration. The pegs or grips (15) may assist in limb support (L) configuration. In some embodiments, customised or moulded limb supports (L) can be used with the device or may be retrofitted to existing limb supports (L) of the device.

The static part ($L_s$) is shown in an L-shaped arrangement. Such an arrangement allows a portion of a user's limb, for example a forearm, to be supported against the upright of the L-shape and nestled into location by pegs or grips (15). The static part ($L_s$) is also position adjustable relative to the moveable part ($L_m$). The position of the static part ($L_s$) is adjustable via a series of locators. Locators can be in the form of protrusions (18) extending from the substrate or desk (14) that engage sympathetic portions (19, not shown) of the static part ($L_s$).

FIG. 3 also simply illustrates a plan view of the limb supports (L) as they appear in FIG. 2.

Figure 4:
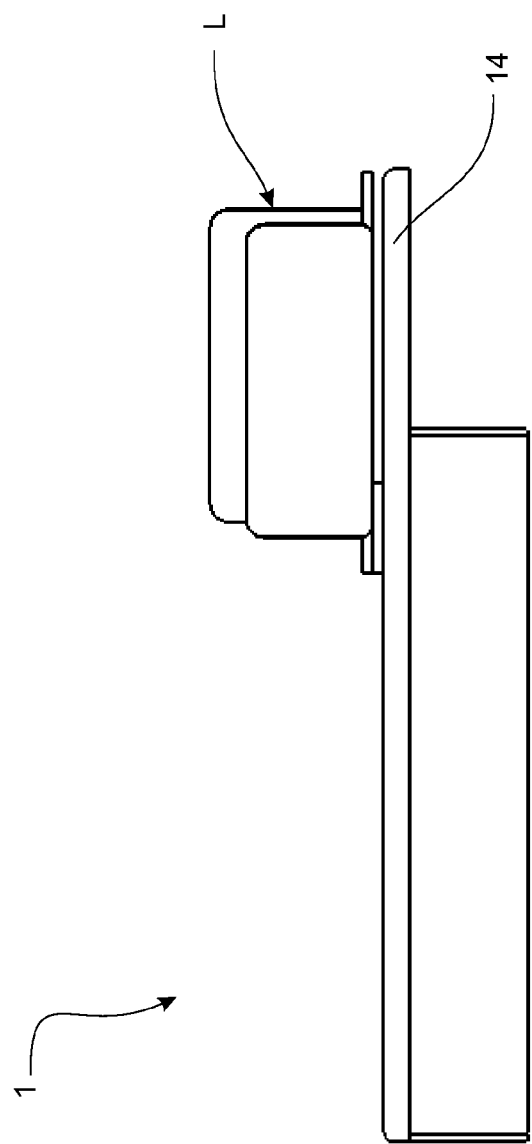
FIG. 4 is a side elevation view of one embodiment of a device according to the invention.

FIG. 4 is a side elevational view of the limb supports (L) as shown in FIGS. 2 and 3. It will be clear that a connection, such as the fixed pivot point (7) is shown which connects the limb supports (L) to the support arms (not shown).

FIGS. 1A-1D illustrate sequences of the bars (3, 4) as they rotate and also the support arms (2) at variously rotated positions as they move through their tandem synchronised/mirror symmetrically constrained motion. From a stationary mode, the device of FIG. 1A is caused to operate by the application of a direct force from a user. These drawings shall now be used as an example of a user initially applying a direct force to the support arms in a direction indicated by arrow F2. This force can of course be supplemented or complimented by an indirect force means. FIGS. 10A-10F also helps illustrate the sequence of movements of the device (1a).

Figure 1B:
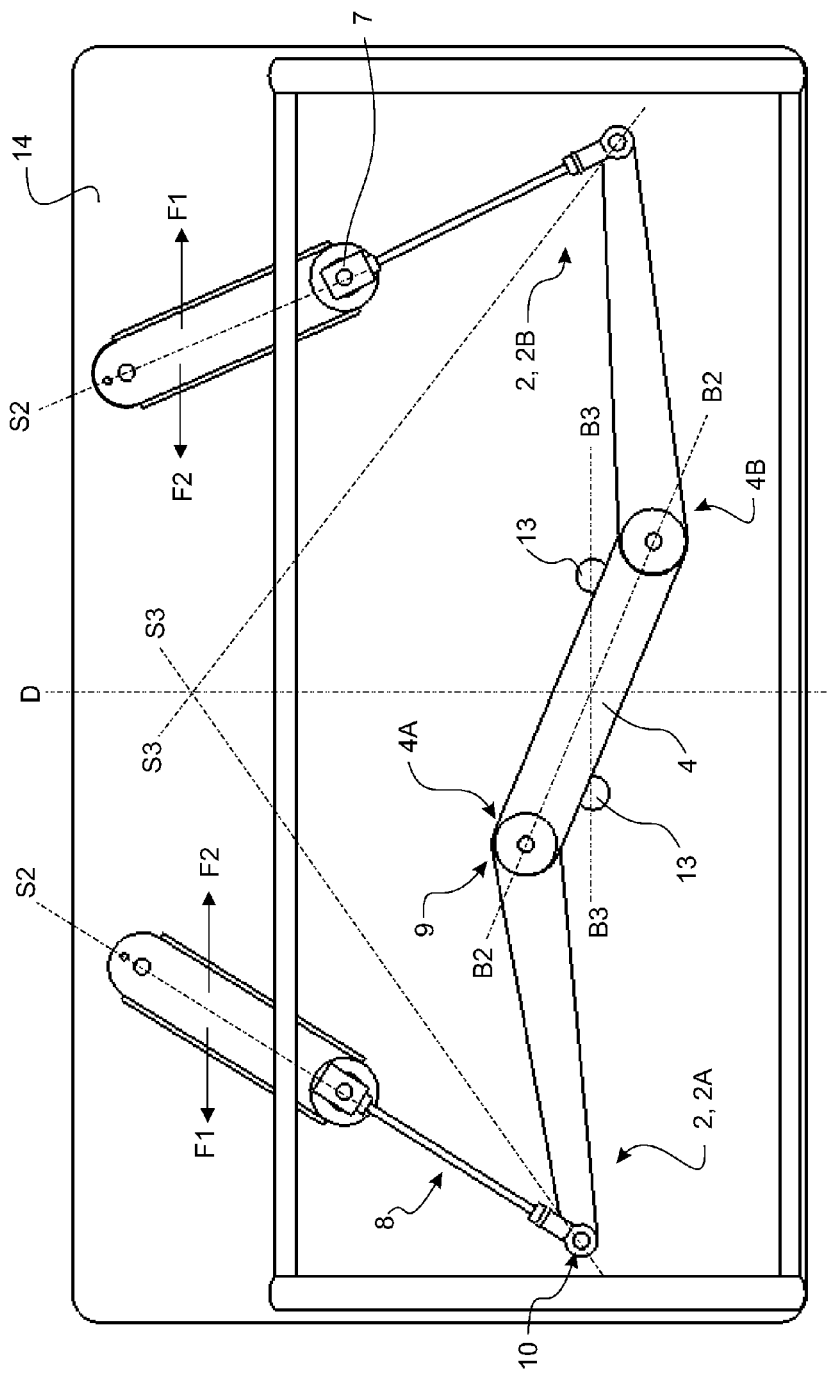
FIG. 1B is a plan view from underneath the embodiment of the device according to FIG. 1A, in a further rotated position.

As the applied force in direction F2 is transmitted via the support arms to the ends of the bars (3, 4), and if the force applied is sufficient to initiate bar rotation, the bars (3, 4) shall rotate in an anti-clockwise manner about the pivot (5) (the details of which are hidden by the second bar (4) in FIGS. 1A-1D, but shown in FIGS. 10A-10F). As the force is continued to be applied, or if the bars (3, 4) have sufficient angular/rotational momentum to continue their own rotation, the bar shall rotate from initial position (B1) in FIG. 1A to position (B2), as shown in FIG. 1B. Of course, both the first and the second bars (3, 4) are rotating in tandem, but the first bar (3) is not seen in these particular views as it lies behind the second bar (4). The first bar (3) is however connected to the second bar (4) and moves in tandem, so it shall be clear that the same movement taking place with regard to the second bar (4) is the same as that of the first bar (3).

The support arms (2A, 2B) shall have moved from their initial position (S1) in FIG. 1A inwards toward each other to position (S2) in FIG. 1B. The support arms (2A, 2B) reach an "inwardly" extended position, extended towards the centreline indicated by dashed line 'D', as they substantially approach position S3. Of course, this is only generally illustrative as the proximal end (9) of the support arms (2) will also have moved in position and so the true angle of the distal end (8) of the support arms (2) will be different to that shown, which influences the actual angle of the distal end (8). However, the illustration of position S3 and subsequently of position S6 does help to demonstrate the operation of the device (1). It would be at this extended position (S3) that the bars (3, 4) would have further rotated to position B3. When the bars (3, 4) are at position B3 the support arms (2) are at a fully inwardly extended position. Once the bars (3, 4) reach angularly rotated position B3, due to the fixed pivot point, the momentum of the bars (3, 4) carry the bars in a rotation about the pivot (5), and the support arms are caused to move back in the direction of arrow F1. The bars (3, 4) continue in their rotation, anti-clockwise. The user at this time will have realised that the motion of the support arms (2) had changed direction. The user should then, preferably, be attempting to input a force in the direction of arrow F1.

Figure 1C:
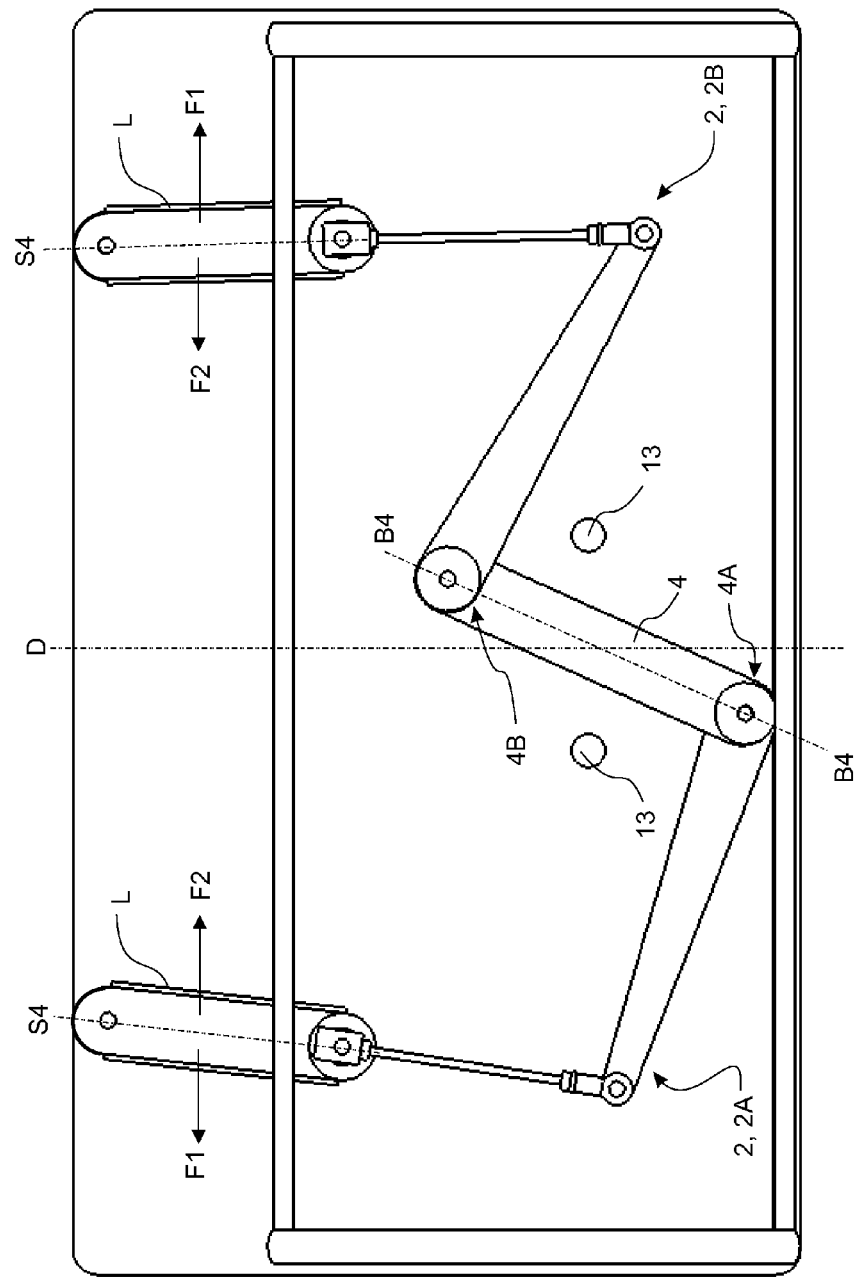
FIG. 1C is a further rotated view of the device according to FIGS. 1A and/or 1B.
Figure 1D:
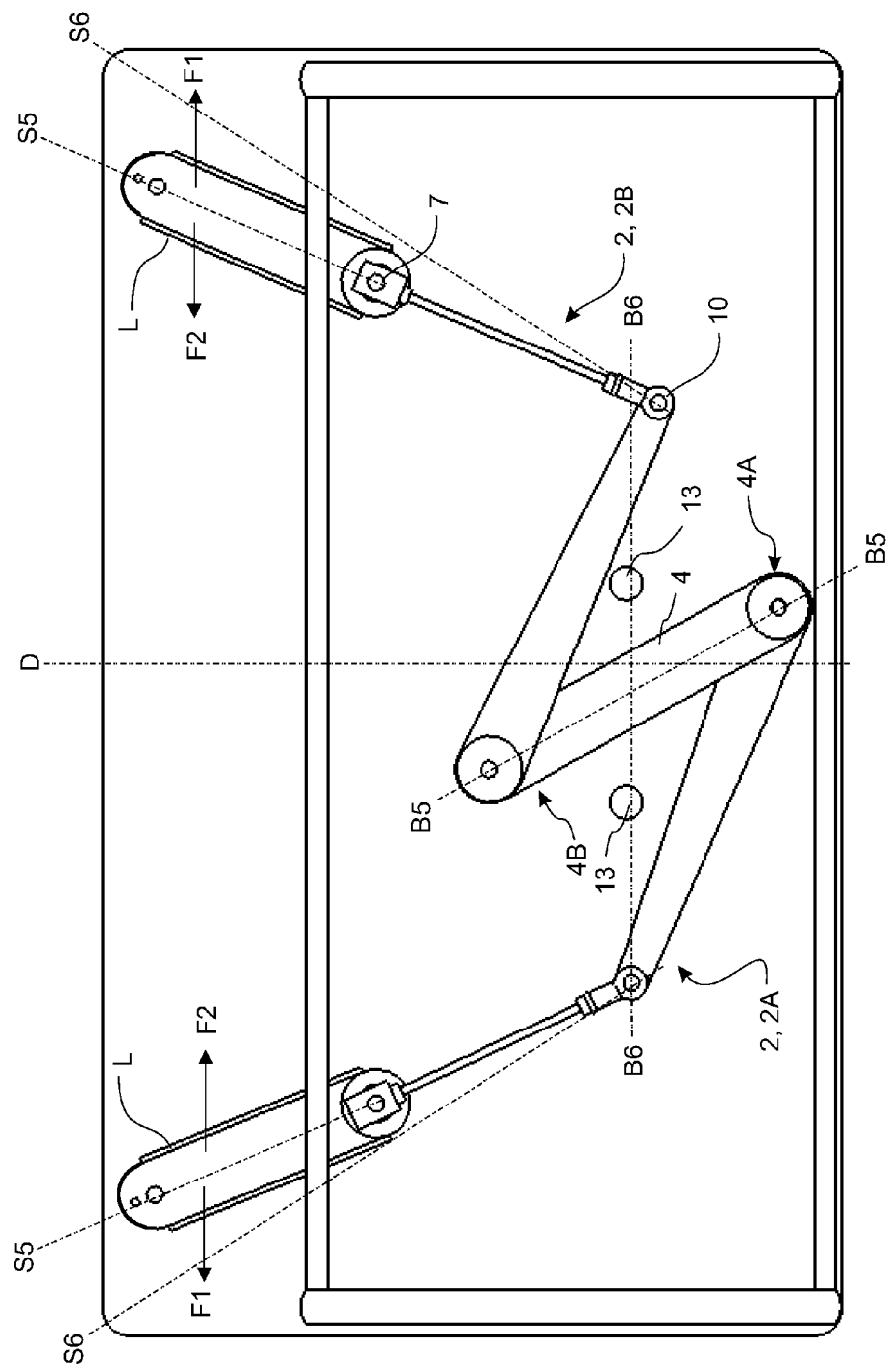
FIG. 1D is an even further rotated view of the device according to any one of FIGS. 1A, 1B and/or 1C.

FIG. 1C illustrates a position of the bars (3, 4) and supports arms (2A, 2B) as the arms (2) have moved from position S3 in FIG. 1B outwards to position S4. The bars (3, 4) have rotated further, anti-clockwise from position B3 in FIG. 1B to position B4 in FIG. 1C. As the support arms (2) continue their "outward" extension, the support arms proceed further to reach position S5 shown in FIG. 1D. Likewise, the bars (3, 4) have further rotated and turned from position B4 through to position B5 as shown in FIG. 1D. The support arms (2) are able to continue extending outwardly in direction indicated by arrow F1 until the bars (3, 4) reach position B6 at which point the support arms (2) have reached the outwardly extended reach position, substantially indicated as support arm position S6. As mentioned previously, position S6 is not the true position of the support arms at an outwardly extended position, but it does help to illustrate the operation of the device (1).

As discussed previously, assuming that the bars (3, 4) have sufficient momentum (or are provided with further direct or indirect force input) to continue rotating about the fixed pivot (5), the support arms (2) then begin to move inwardly back towards each other (towards the centre line (D)) in the direction indicated by arrow F2, having been constrained in their extension. Support arms (2) then proceed on an inwards extension, heading back to reach position S1, and bars (3, 4) position of B1. Following the above mechanism, a complete rotation of the bars (3, 4) and one full cycle of mirror symmetrical movement of the support arms (2) is completed. By repeated input of energy to the rotation of the bars (3, 4), from the input of a user or in combination with any of the above described modes of force input (direct or indirect) the bar may continually rotate. In this manner, the device can act as a training device. Repeated cycling can aid in the re-training or enhanced excitability of brain function in the rehabilitation of for example, stroke patients.

It shall of course be appreciated that any additional number of intermediate steps between the "inwardly extended" and "outwardly extended" positions of the support arms (2) and partially rotated positions of the bars (3, 4) could be described. The above however provides sufficient to understand the mechanism of one particular embodiment of the invention.

Figure 13:
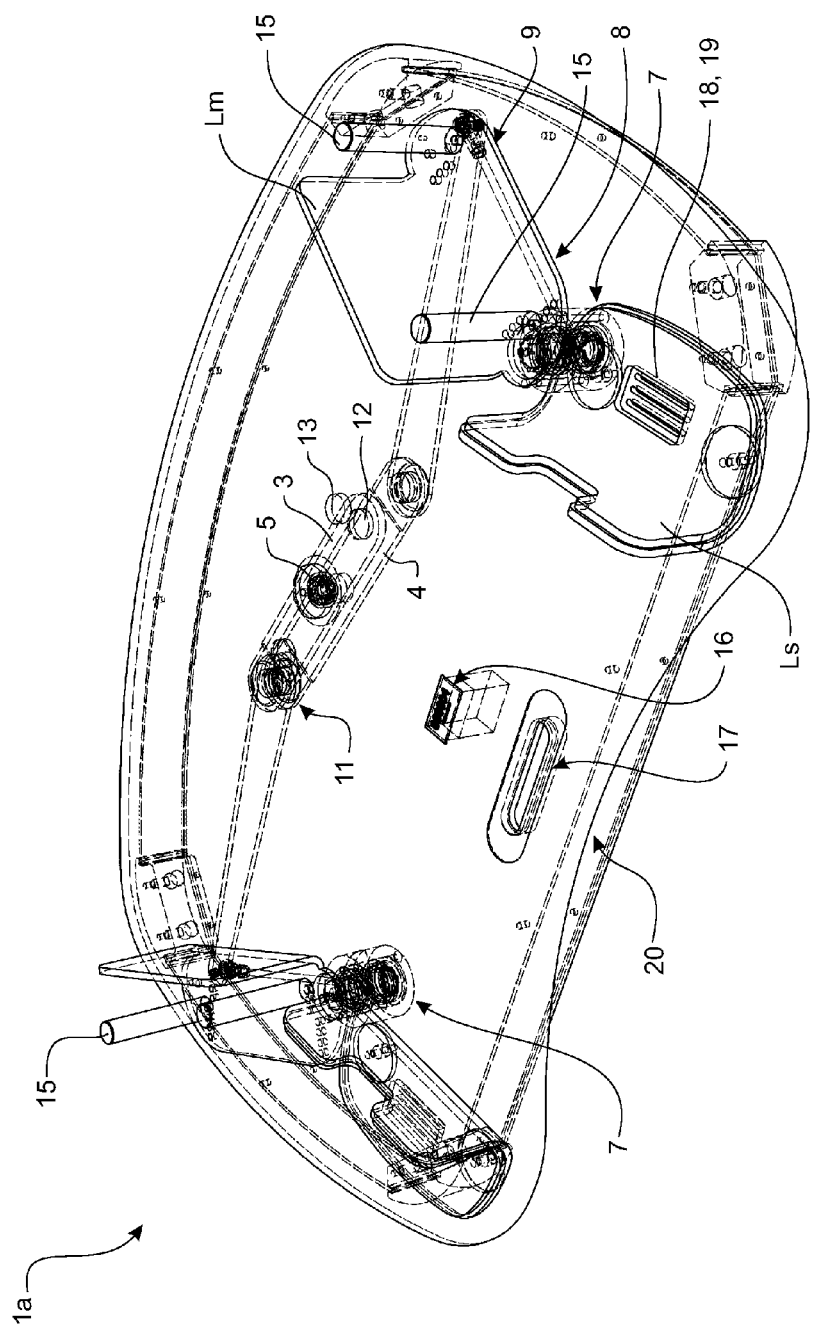
FIG. 13 is a perspective cut-away view of another embodiment of a device according to the invention.

FIGS. 5 and 13 illustrate a top perspective view of the embodiments described above in relation to FIGS. 1A-1D and 10A-10F. Shown are the support arms (2A, 2B), limb supports (L), the first and second bars (3, 4), the first end (3A) of the first bar (3) and the second ends (3B, 4B) of both the first and second bars (3, 4). Pivot (5) is also shown. FIGS. 5 and 13 are a partial cut-away view of the device (1, 1a), and it should be clear that the support arms and bars are located below the top surface of for example, the desk (14).

FIGS. 5 and 13 also illustrate another embodiment of the device (1, 1a) showing support arms (2) configuration which involve an articulated joint (10). The support arms (2) are also fixedly pivoted about pivot (7). In this manner, as a user imputes a force to the support arms (2) via the limb supports (L), the force is translated along the articulated arm, about a second moveable pivot or articulated joint (10) before the operative coupling to the ends (3A, 4B) of the bars (3, 4). FIGS. 5 and 13 are applicable to the embodiments described above.

FIG. 6 is a further embodiment of that illustrated by FIG. 5. However FIG. 6 incorporates fixed or permanent magnets (12, 13). Magnets (12, 13) are also shown in similar FIG. 13. The magnets are located both upon the bars (3, 4), as well as upon the corresponding substrate or desk portion (14) which enables magnetic interference of the same magnetic field magnets.

FIGS. 7A, 7B, 14A and 14B illustrate further details of the embodiments described above. In particular, FIGS. 7A and 14A show the first bar (3) and the second bar (4) as well as each of the interconnecting operative couplings and pivots. FIGS. 7B and 14B show in closer detail the connection between the second bar (4) and the first bar (3). A rotatable coupling is shown between the first bar (3) and the first support arm (2A) and between the second bar (4) and the second support arm (2B). A static coupling or connection (11) is shown connecting the first and second bars (3, 4). Magnet means (12) are also shown, as is the bar pivot (5). FIGS. 14A and 14B additionally illustrate the static and moveable limb supports ($L_s$, $L_m$) and pegs or grips (15).

Figure 15A:
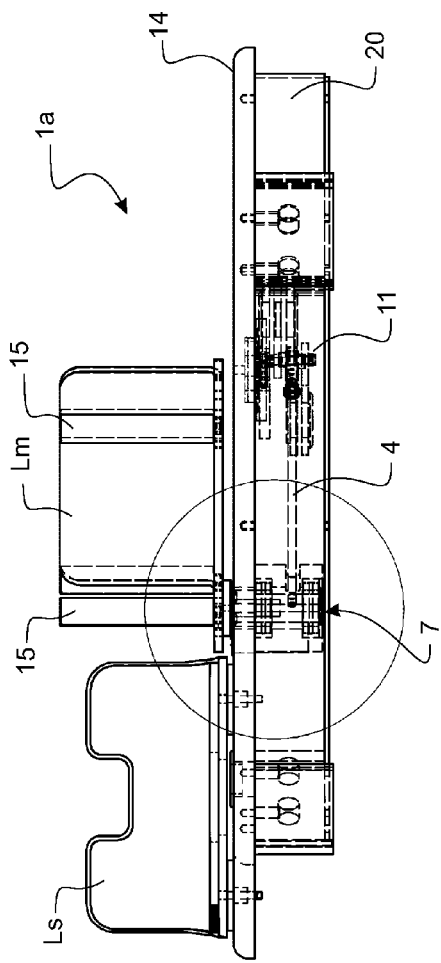
FIG. 15A is a sectional side elevation view of one embodiment of a device according to the invention.
Figure 15B:
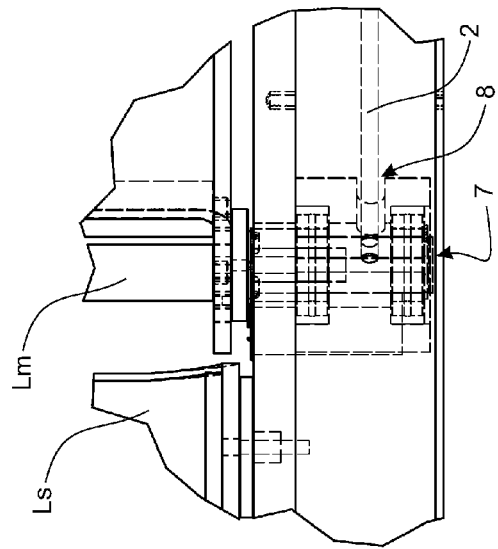
FIG. 15B is an enlarged view of the section circumscribed in FIG. 15A.

FIGS. 8A, 8B, 15A and 15B illustrate further details of the embodiments described above. Magnet means (12, 13), pivot (5) and the relationship between the operative couplings, support arms (2), bars (3, 4), and limb supports (L) and the substrate or desk (14) to which the device (1) is affixed is also shown. FIGS. 8B and 15B show closer details of the support arms (2) having articulations. FIGS. 15A and 15B additionally illustrate the static and moveable limb supports ($L_s$, $L_m$) and pegs or grips (15).

FIGS. 10A-10F and 11-13 further illustrate a counter (16). A counter (16) can be used to display the or an indication of the number or of an accumulated number of mirror symmetrical movements or repetitions performed by the device or the user. The counter (16) can be located on a top surface of the desk portion (14), although in various embodiments it may be a separate device, for example a wireless displace device.

The counter (16) illustrated in FIGS. 10A-10F and 11-13 is shown as having a digital display readout, although it can be an analogue or mechanical display. Information of about the number of movements performed by the device can be sensed by an optical or a mechanical sensor. The sensor (not shown) may be a part of a sensing system gathering information about use of the device. That information can be used for user purposes or for monitoring a user's level of use of the device (1a). The information can also be used to evaluating wear and tear on the device (1a) or its parts.

FIGS. 10A-10F and 11-13 also illustrate a handle (17) for ease of portability of the device. The handle (17) can be a carry handle.

It should also be appreciated the device (1a) can form a part of a desk (14) arrangement, but can itself be a portable unit. The device (1a) can also be housed within a housing (20) to prevent any moving parts from being damaged during transportation or injuring a user. The housing (20) can be disassembled to allow entry to the internal workings of the device (1a). This may be particularly advantageous for servicing or maintenance purposes.

It should also be appreciated that another embodiment of the device would be such that the bar (3) is the only bar and the support arms (2) are operatively coupled substantially at, or towards, each end of the bar. In such a configuration, the above description applies, although the lateral spacing of the support arms and bar is such that uninhibited rotation can take place. Likewise, as there is only a single rotatable bar, there is no need for any other bars to be connected to it. FIG. 9 illustrates a simplified, partial elevation of such an arrangement. The central bar (3) and the support arms (2) are shown, but no other details. However, it will be appreciated that any suitable means may be used to support and allow rotation of the bar (3). For example, the bar (3) may be supported and enabled to rotate via ball bearings or similar such systems. FIG. 9 also illustrates an example of a lateral spacing in which the support arms (2) are separated or disposed either side of the bar (3).

The device can be used with arm limbs or leg limbs.

Example 1

A particular example of a mirror symmetrical movement of limbs using the device would, in one embodiment, be as follows. Note that this example is made with reference in this particular instance to arm limbs, but it could equally be applied to any other limb having an opposing member (for example thumbs, fingers, wrists, feet, toes, or legs). With the arms bent at the elbow in a substantially 90° angle from the vertical (i.e. bent at the elbows as if the forearms were resting on a horizontal surface) and with the upper arms hanging substantially vertically (i.e. hanging beside the torso or chest wall), the portions of the user's limbs, for example their hands and wrists and separately their forearms are placed into limb supports (L) or rest upon a supporting arm (2) of the device (1, 1a). The limb supports (L) can be adjusted or fitted to the portions of the user's limbs to constrain the limbs to the supports (L). A moveable limb support ($L_m$) receives the wrist or hand portion of the user's limb. The static limb support ($L_s$) receives the forearm portion of the user's limb.

This example exemplifies a situation where a user has control and physical capabilities of their right arm, but where there is impairment in the control and physical capabilities of their left arm. This example is also based on the bars (3, 4) having no initial rotational movement and that the device (1, 1a) is operated from a stationary mode.

With their arms resting in place upon the limb supports (L), the user imputes a lateral driving force with their right hand against the moveable limb support ($L_s$) (either in an "inwards" direction indicated by arrow F1 or "outwards" lateral direction indicated by arrow F2). This force biases the right support arm to transfer such force to an end of the bars (3, 4). This force in turn applies a torque about the bar. Once the applied torque is sufficient to overcome friction, the bars (3, 4) are caused to rotate. As the bars (3, 4) begin to rotate, and because the moveable limb supports ($L_m$) are connected to the support arms (2) which are operatively coupled with the bars (3, 4), the user's left wrist or hand portions located in the left moveable limb support ($L_s$) is caused to move in a mirror symmetrical manner to the portion of the user's right arm portion located in the right moveable limb support ($L_m$). This causes both the right and left arms to be manipulated. This can be referred to as bi-manual movement, where both arms are being substantially commensurately exercised through a range of motion.

It is not a desirable outcome of the invention to yield an over compensatory physical strength gain of one limb over another. This may however have occurred in a stroke patient as a natural result of additional use of one (operational) limb over another (impaired) limb.

Example 2

A more detailed example of a user operating the device (1, 1a) with their left and right forearms would be as follows. The upper portions of the arms hang lose by their torso. The forearms are articulated and bent at a substantially right angle. In this position the forearms of each arm can be cradled to rest upon the support arms (2) or in the limb supports (L). Then, as the bars (3, 4) rotate, and depending upon the initial position of the support arms (2), the user's forearms are caused to move towards each other until an extended position is reached. Once the forearms arrive at this extended reach position, given the device configuration, the supports arms (2) and thus the limb supports (L) are then caused to move in the opposite direction. Moving in the opposite direction the forearms move away from each other until an extended reach position is arrived at.

Various alternative limb movements may be created or desired. For example, rather than the above exemplified movement the forearms may instead pivot at the wrist, for example when a hand portion of a user's limb is located in a moveable limb support ($L_m$) with the forearm located in the static limb support ($L_s$).

Such movement allows repeated cyclical motion to be achieved. This allows the device of the invention to be utilised as a training device.

The foregoing description of the invention includes preferred forms thereof. Aspects of the invention have been described by way of example only and it should be appreciated that modifications may be made thereto without departing from the scope of the invention.

The invention claimed is:

1. A device for controlling of movement of the wrists of the upper limbs of a user in a substantially mirror symmetrical manner, a user's wrists being held in position via support arms, the device comprising:
   a bar adapted to move about a point of rotation, the bar having a first end and a second end, the ends separated by the point of rotation,
   a first support arm operatively coupled towards one end of the bar and a second support arm operatively coupled towards a different end of the bar, wherein the first and second support arms are adapted to substantially support or hold the wrists of a user of the device, the first and second support arms and the bar configured such that, in use, as the bar rotates the user's wrists are supported or held by the support arms to move in a substantially tandem mirror symmetrical synchronized manner with respect to each other for cycling between a flexion and an extension of the user's wrists, and wherein the movement of the bar and operatively coupled support arms provide for a continued repetitious cycling between a flexion and an extension of the user's wrists, the movement facilitated by initiating or maintaining of rotational movement of the bar about the point of rotation.

2. The device as claimed in claim 1, wherein the bar functions as a flywheel.

3. The device as claimed in claim 1, wherein each support arm has a distal end and a proximal end, the proximal end operatively coupled to the bar via a fixed point of rotation.

4. The device as claimed in claim 3, wherein each support arm is articulated or pivotable about a point between the distal end and proximal end.

5. The device as claimed in claim 1, wherein each support arm is an articulated linkage.

6. The device as claimed in claim 1, wherein the bar comprises a first magnetic device having an opposing magnetic field to a second magnetic device located upon a substrate to which the device for controlling movement is attached.

7. The device as claimed in claim 6, wherein the first one or mere magnetic device is located in sufficient proximity to the second magnetic device such that the respective magnetic fields oppose and interfere with one another.

8. The device as claimed in claim 7, wherein the magnetic devices are operatively controlled such that generated electromagnetic pulses assist with a rotational propulsion of the bar.

9. The device as claimed in claim 1, wherein a direct drive is connected to the bar or to one or both of the first support arm and the second support arm, wherein the direct drive rotates the bar, the direct drive comprising more of the following: an electric motor, an manually manipulated drive handle.

10. The device as claimed in claim 1, wherein the first and second support arm comprises a limb support adapted to substantially support or hold or position the limb of a user of said device.

11. The device as claimed in claim 10, wherein the limb support comprises a static part and a moveable part.

12. The device as claimed in claim 11, wherein the moveable part is connected to the support arm by a pivoting joint.

13. The device as claimed in claim 12, wherein the static part is configured to receive a first portion of a user's limb in a fixed position relative to the device.

14. The device as claimed in claim 13, wherein the moveable part is configured to receive a second portion of the user's limb in a position moveable relative to the device.

15. The device as claimed in claim 11, wherein the static part and moveable part are configured relative each other to allow a user to immobilise a first portion of a limb in a static position and to immobilise a second portion of the users limb in the moveable part, the moveable part moveable by the first or second or both support arms.

16. The device as claimed in claim 1, wherein the bar and the support arms are arranged such that the bar moves through at least a 360° revolution uninhibited.

17. The device as claimed in claim 1, wherein the first support arm is operatively coupled towards one end of said bar on a first side of the bar and a second support arm is operatively coupled towards a different end of the bar and on a different or opposite side of the bar.

* * * * *